United States Patent
Kan

(10) Patent No.: US 7,616,550 B2
(45) Date of Patent: Nov. 10, 2009

(54) OPTICAL PICKUP UNIT

(75) Inventor: Kenji Kan, Saitama (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 544 days.

(21) Appl. No.: 11/424,501

(22) Filed: Jun. 15, 2006

(65) Prior Publication Data
US 2006/0285473 A1    Dec. 21, 2006

(30) Foreign Application Priority Data
Jun. 16, 2005   (JP)   ............................. 2005-176478
May 9, 2006    (JP)   ............................. 2006-129981

(51) Int. Cl.
G11B 7/135    (2006.01)

(52) U.S. Cl. ............................. 369/112.17; 369/112.16; 369/44.32; 369/44.37

(58) Field of Classification Search ............. 369/112.16
See application file for complete search history.

(56) References Cited

U.S. PATENT DOCUMENTS

| | | | | |
|---|---|---|---|---|
| 4,085,423 A | * | 4/1978 | Tsunoda et al. | 369/44.37 |
| 5,673,247 A | * | 9/1997 | Sekimoto et al. | 369/112.17 |
| 5,892,749 A | * | 4/1999 | Yamanaka | 369/112.17 |
| 6,009,066 A | * | 12/1999 | Yoo et al. | 369/112.1 |
| 6,034,939 A | * | 3/2000 | Takasawa et al. | 369/112.17 |
| 6,545,958 B1 | * | 4/2003 | Hirai et al. | 369/44.32 |
| 6,636,464 B1 | * | 10/2003 | Lee et al. | 369/44.23 |
| 2005/0286386 A1 | * | 12/2005 | Edwards et al. | 369/103 |
| 2006/0018214 A1 | * | 1/2006 | Fujii et al. | 369/44.37 |
| 2006/0164954 A1 | * | 7/2006 | Hashimura | 369/112.01 |
| 2006/0181977 A1 | * | 8/2006 | Heor | 369/44.37 |
| 2008/0031099 A1 | * | 2/2008 | Tezuka | 369/44.14 |

FOREIGN PATENT DOCUMENTS

| | | |
|---|---|---|
| JP | 11-224436 | 8/1999 |
| JP | 2005-32286 | 2/2005 |

OTHER PUBLICATIONS

Matsubayashi JP 11-120606 Abstract only.*

* cited by examiner

*Primary Examiner*—Wayne R Young
*Assistant Examiner*—Van N Chow
(74) *Attorney, Agent, or Firm*—Fish & Richardson P.C.

(57) ABSTRACT

An optical pickup unit is disclosed that comprises a first light-emitting element capable of emitting first-wavelength light; a second light-emitting element capable of emitting second-wavelength light whose wavelength is different from that of the first-wavelength light; a polarizing mirror transmitting or reflecting the first-wavelength light and reflecting the second-wavelength light; a first objective lens converging the first-wavelength light on a first medium; and a second objective lens converging the first-wavelength light or the second-wavelength light on a second medium.

9 Claims, 5 Drawing Sheets

OPTICAL PICKUP UNIT

CROSS-REFERENCE TO RELATED APPLICATIONS

This application claims priority from Japanese Patent Applications Nos. 2005-176478 and 2006-129981 filed on Jun. 16, 2005 and May 9, 2006 respectively, which are herein incorporated by reference.

BACKGROUND OF THE INVENTION

1. Field of the Invention

The present invention relates to an optical pickup unit capable of reproducing data recorded on plural types of media such as HD DVDs (High Definition DVDs) (registered trademark) or Blu-ray Discs (registered trademark) and of recording data onto plural types of media.

2. Description of the Related Art

FIG. 5 is a schematic diagram of one form of a conventional optical pickup unit.

An optical disk device is used to reproduce or record data such as information from/onto media. "Media" mean ones recording and mediating information or ones recording and transmitting information. One example of the media is an optical disk 700 such as a CD (Compact Disc) (trademark).

Current flows from a laser driver 510 to a laser diode 520. From the laser diode 520 a laser light (laser: Light Amplification by Stimulated Emission of Radiation) is outputted. The laser driver 510 acts as a laser driving circuit 510 for driving the laser diode 520 to cause the laser diode 520 to emit laser light. By the action of laser light emitted from the laser diode 520 as a result of supplying current from the laser driver 510 to the laser diode 520, information is recorded on the disk 700 or information recorded on the disk 700 is reproduced.

Laser light outputted from the laser diode 520 is applied to the disk 700 via a diffraction grating 530, an intermediate lens 540, a half-mirror 550, and an objective lens 560. The diffraction grating 530 is intended to split the laser light emitted from the laser diode 520 into several beams (not shown) by utilizing diffraction of light. The objective lens 560 serves to converge laser light into a signal portion 701 of the disk 700. Part of laser light reflected on the disk 700 returns to a photodetector 570, etc. When receiving light, the photodetector 570 converts the signal to an electrical signal to output a signal for operating a servo mechanism (not shown) of a lens holder (not shown) of an optical pickup unit 501. "Servo" or "servo mechanism" means a mechanism measuring the status of an object to be controlled and comparing the measurement with a reference value, for automatic correction control.

Part of laser light outputted from the laser diode 520 enters a front monitor diode 580. The front monitor diode 580 is intended to monitor laser light outputted from the laser diode 520 to perform feedback for controlling the laser diode 520. A housing (not shown), for example, is fitted with the laser driver 510, the laser diode 520, the diffraction grating 530, the intermediate lens 540, the half-mirror 550, the objective lens 560, the photodetector 570, and the front monitor diode 580. "Housing" means a box or box-like one enclosing components or constituent elements.

The laser driver 510, the laser diode 520, the photodetector 570, and the front monitor diode 580 are conductively connected to a flexible printed circuit 505. Description will be made of processes of fabricating the flexible printed circuit. A plurality of circuit conductors in the form of metallic foils such as copper foils are printed and juxtaposed on an insulating sheet. Protective layers are disposed on the circuit conductors to form the flexible printed circuit. The optical pickup unit 501 is configured as being provided with the above various elements. Although the optical pickup unit 501 is provided with other constituent elements than the shown ones, those constituent elements are not shown in FIG. 5 for convenience' sake. Laser light emitted from the laser diode 520 of the optical pickup unit 501 passes through the objective lens 560 and is applied to the optical disk 700 such as a CD loaded in a player body. By the action of laser light emitted from the laser diode 520, information is recorded in the optical disk 700 or information recorded in the optical disk 700 is reproduced. Information recording or reproduction is thus carried out in the optical disk device.

An example of the conventional optical pickup unit is an optical pickup not requiring a special variable diaphragm and applicable to all types of CDs (Compact Discs) and DVDs (Digital Versatile Discs). Such a conventional optical pickup unit is disclosed in e.g., Japanese Patent Application Laid-Open Publication No. 1999-224436 (pp. 1 and 3, FIG. 3).

Another example of the conventional optical pickup unit is an optical pickup unit and an optical disk device capable of realizing either thinning the device or miniaturizing the device even when the device is made to cope with lasers of various wavelength including blue laser. Such a conventional optical pickup unit is disclosed in e.g., Japanese Patent Application Laid-Open Publication No. 2005-32286 (pp. 1 and 3, FIG. 3).

Release was recently made of media of various standards such as "Blu-ray Disc" standard or "HD DVD" standard capable of higher-density recording than the conventional CD standard or DVD standard. The above conventional optical pickup unit 501 of FIG. 5 is however incapable of supporting a high-density recording optical disk such as Blu-ray Disc though it supports only the conventional optical disk 700 such as CD.

Media of the new standard, Blu-ray Disc standard incapable of serving the conventional standards but capable of high-density recording are considered as being of different standards from the DVD-standard media such as "HD DVD" and from CD-standard media. It has hitherto been considered difficult to develop a single optical pickup unit capable of supporting the above various media of quite different standards.

Conceived to cope with this was an optical disk device (not shown) having a plurality of optical pickup units capable of supporting a variety of media. One example thereof was an optical disk device provided with a first optical pickup unit (not shown) supporting Blu-ray Disc-standard media and with a second optical pickup unit (not shown) supporting both DVD-standard media and CD-standard media.

Such an optical disk device provided with a plurality of optical pickup units, the first optical pickup unit (not shown) supporting Blu-ray Disc-standard media and the second optical pickup unit (not shown) supporting both DVD-standard media and CD-standard media has however been considered to undergo possible deficiencies such as increase in the number of components resulting in increased size and weight as well as increased price.

SUMMARY OF THE INVENTION

It is therefore an object of the present invention to provide an optical pickup unit capable of supporting a variety of media including conventional optical disks as well as high-density recording optical disks.

In order to achieve the above object, according to a major aspect of the present invention there is provided an optical pickup unit comprising a first light-emitting element capable of emitting first-wavelength light; a second light-emitting element capable of emitting second-wavelength light whose wavelength is different from that of the first-wavelength light; a polarizing mirror transmitting or reflecting the first-wavelength light and reflecting the second-wavelength light; a first objective lens converging the first-wavelength light into a first medium; and a second objective lens converging the first-wavelength light or the second-wavelength light into a second medium.

The above configuration enables an optical pickup unit to be provided that supports a first medium and a second medium even if the standard of the first medium is different from that of the second medium. If the first medium is a medium not serving the conventional standards but allowing high-density recording and if the second medium is a medium serving the conventional standards, it has been difficult to develop a single optical pickup unit capable of supporting both the first medium and the second medium that have quite different standards. To deal with this, it was also conceived to employ two different optical pickup units, a first optical pickup unit supporting the first medium and a second optical pickup unit supporting the second medium for example. It was however feared due to increase in the number of components that using the plurality of optical pickup units may be faced with increased dimensions resulting in increase of weight and raise in price. On the contrary, by configuring the optical pickup unit to include a first light-emitting element capable of emitting first-wavelength light; a second light-emitting element capable of emitting second-wavelength light whose wavelength is different from that of the first-wavelength light; a polarizing mirror transmitting or reflecting the first-wavelength light and reflecting the second-wavelength light; a first objective lens converging the first-wavelength light into a first medium; and a second objective lens converging the first-wavelength light or the second-wavelength light into a second medium, a single optical pickup unit becomes able to support both the high-density-recording-standard first medium and the second medium serving the conventional standards different from the standard of the first medium. Thus, there can be provided an optical pickup unit supporting multiple media of different standards.

The optical pickup unit of the present invention may further comprise a liquid crystal element capable of freely polarizing the first-wavelength light.

The above configuration enables the first-wavelength light to selectively be directed toward the first objective lens or toward the second objective lens. In response to the change in the state of polarization of the first-wavelength light induced by the liquid crystal element, the first-wavelength light is allowed to pass through or reflect from the polarizing mirror. As a result of this, the first-wavelength light can be directed either toward the first objective lens or toward the second objective lens.

In the optical pickup unit of the present invention, when the first-wavelength light traveling by way of the polarizing mirror is p-waves, the first-wavelength light may pass through the polarizing mirror to reach the first objective lens.

The above configuration enables the first-wavelength p-laser light to pass through the polarizing mirror to securely reach the first objective lens. "P" of p-waves is an abbreviation of "parallel" in German, which means "parallel". The first-wavelength light passing through the polarizing mirror is regarded as p-waves, making the state of polarization of the first-wavelength light clear. The polarizing mirror is formed as transmitting the first-wavelength p-laser light. In consequence, the first-wavelength p-laser light can securely pass through the polarizing mirror to securely reach the first objective lens.

In the optical pickup unit of the present invention, when the first-wavelength light traveling by way of the polarizing mirror is s-waves, the first-wavelength light may reflect from the polarizing mirror to reach the second objective lens.

The above configuration enables the first-wavelength s-laser light to reflect from the polarizing mirror to securely reach the second objective lens. "S" of "s-waves" is an abbreviation of "senkrecht" in German, which means "vertical". The first-wavelength light traveling by way of the polarizing mirror is regarded as s-waves, making the state of polarization of the first-wavelength light clear. The polarizing mirror is formed as reflecting the first-wavelength s-laser light. Consequently, the first-wavelength s-laser light can securely be reflected by the polarizing mirror to securely reach the second objective lens.

The optical pickup unit of the present invention may further comprise a third light-emitting element capable of emitting third-wavelength light whose wavelength is different from that of the first-wavelength light and from that of the second-wavelength light.

The above configuration enables the optical pickup unit to support media adapted to the third-wavelength light. The optical pickup unit supporting multiple media can thus be provided.

In the optical pickup unit of the present invention, the third-wavelength light may be reflected by the polarizing mirror and converged into a third medium by the second objective lens.

The above configuration enables the optical pickup unit to support the third medium adapted to the third-wavelength light. This optical pickup unit becomes able to support the first medium adapted to the first-wavelength light, the second medium adapted to the second-wavelength light, and the third medium adapted to the third-wavelength light. The optical pickup unit supporting multiple media of different standards can thus be provided.

In the optical pickup unit of the present invention, the second light-emitting element may be a dual-wavelength light-emitting element capable of emitting the second-wavelength light and third-wavelength light whose wavelength is different from that of the first-wavelength light and from that of the second-wavelength light.

According to the above configuration, the optical pickup unit capable of supporting various types of media can be configured and reductions in the number of components of the optical pickup unit can be achieved. By virtue of the second light-emitting element configured as the dual-wavelength light-emitting element capable of emitting light having two different wavelengths, i.e., the second-wavelength light and the third-wavelength light, the optical pickup unit becomes able to support diverse types of media. Along with this, since the light-emitting element capable of emitting the second-wavelength light and the light-emitting element capable of emitting the third-wavelength light are integrated into a single light-emitting element, the optical pickup unit can achieve reductions in the number of components, weight, and size as well as a fall in the price. Thus, there can be provided the optical pickup unit capable of supporting multiple media and achieving reductions in the number of components, weight, and size as well as a fall in the price.

BRIEF DESCRIPTION OF THE DRAWINGS

For fuller understanding of the present invention and advantages thereof, the following description is to be referenced in conjunction with the accompanying drawings, in which.

DETAILED DESCRIPTION OF THE INVENTION

At least the following matters will become apparent from the descriptions of this specification and of the accompanying drawings.

Figure 1:
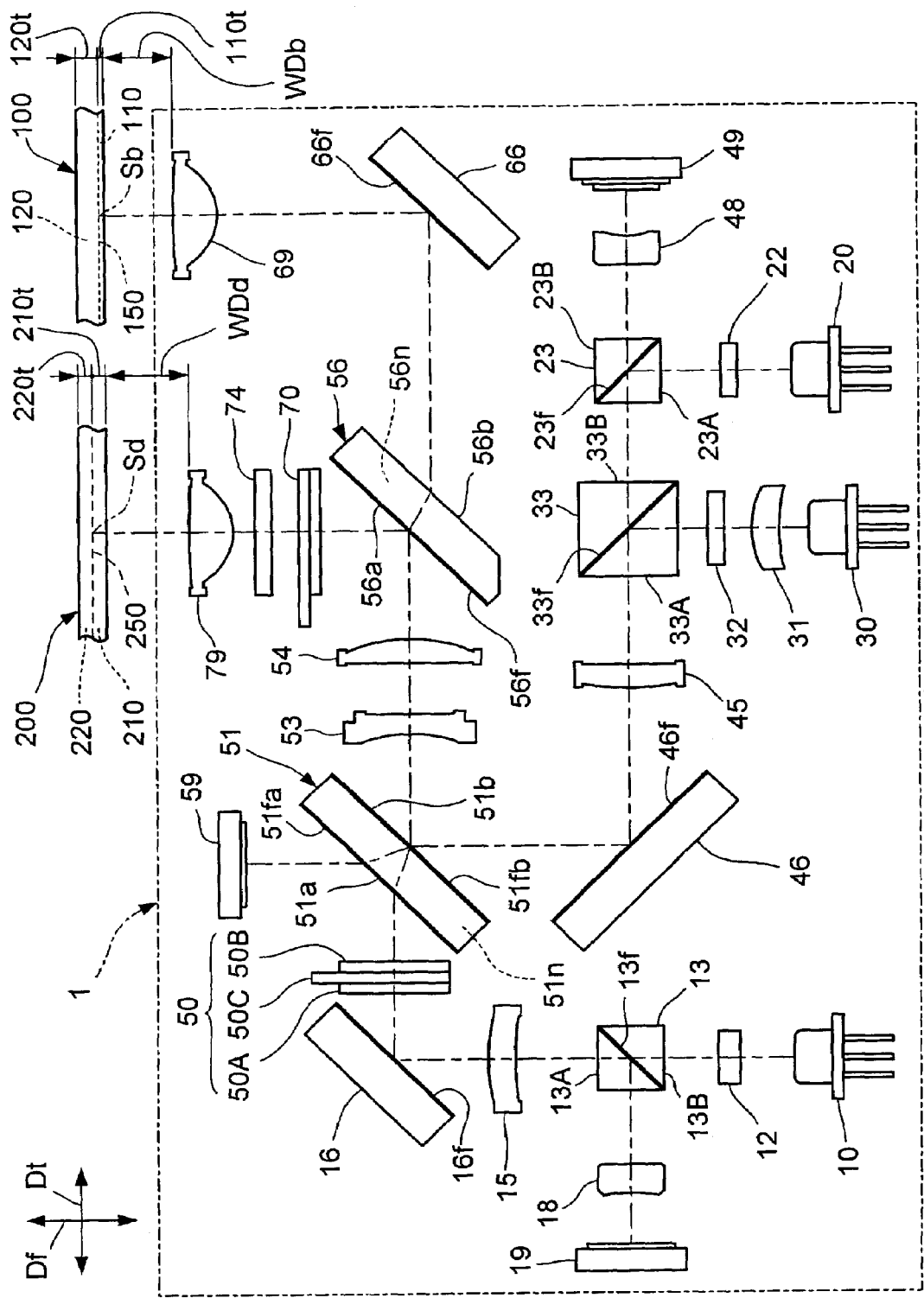
FIG. 1 is a schematic view of a first embodiment of an optical pickup unit according to the present invention.

FIG. 1 is a schematic view of a first embodiment of an optical pickup unit according to the present invention.

A variety of media such as various optical disks are loaded into the interior of an optical disk device (not shown). Optical disks 100 and 200 loaded into the optical disk device (not shown) are in the shape of a disk. The disks can be e.g., data read only optical disks such as "CD-ROM" and "DVD-ROM", data recordable optical disks such as "CD-R", "DVD-R", and "DVD+R", and data writable/erasable and data rewritable optical disks such as "CD-RW", "DVD-RW", "DVD+RW" registered trademark), "DVD-RAM", "HD DVD", and "Blu-ray Disc".

The disk maybe e.g., an optical disk (not shown) having signal faces on its both sides and capable of data write/erase and data rewrite. The disk may be e.g., an optical disk (not shown) having two-layered signal faces and capable of data write/erase and data rewrite. The disk may be e.g., an "HD DVD" optical disk (not shown) having three-layered signal faces and capable of data write/erase and data rewrite. The disk may be e.g., a "Blu-ray" optical disk (not shown) having four-layered signal faces and capable of data write/erase and data rewrite.

A signal portion 150 of a first optical disk 100 is formed of, e.g., a metal layer such as thin metal film. Information or data are recorded on the signal face 150 formed of, e.g., thin metal film. A signal portion 250 of a second optical disk 200 is also formed of, e.g., a metal layer such as thin metal film. Information or data are recorded on the signal face 250 formed of, e.g., thin metal film.

The optical disk device is considered as being capable of supporting the above various disks. The optical disk device is used to reproduce data such as information recorded in the optical disks 100 and 200. The optical disk device is used to record data such as information into the optical disks 100 and 200.

In the optical disks 100 and 200 capable of recording information such as data within the optical disk device, the signal portions 150 and 250 of the optical disks 100 and 200 are provided with grooves to store data/information. "Grooves" mean long narrow channels. The grooves are formed substantially spirally when the disk-shaped optical disks 100 and 200 are viewed in plan. The grooves look spiral when viewing the optical disks 100 and 200 from the side of the signal faces of the optical disks 100 and 200. The grooves are microscopic and invisible. In FIG. 1, the signal portions 150 and 250 of the optical disks 100 and 200 are shown by broken lines for convenience' sake.

The optical disk will be described. "CD" is the abbreviation of "Compact Disc" (trademark). "DVD" (registered trademark) is the abbreviation of "Digital Versatile Disc". "ROM" of "CD-ROM" or "DVD-ROM" is the abbreviation of "Read Only Memory". "CD-ROM" or "DVD-ROM" means data/information read only. "R" of "CD-R", "DVD-R", or "DVD+R" is the abbreviation of "Recordable". "CD-R", "DVD-R", or "DVD+R" means data/information recordable. "RW" of "CD-RW", "DVD-RW", or "DVD+RW" is the abbreviation of "Re-Writable". "CD-RW", "DVD-RW", or "DVD+RW" means data/information rewritable. "DVD-RAM" is the abbreviation of "Digital Versatile Disc Random Access Memory". "DVD-RAM" means data/information readable/writable/erasable.

"HD DVD" is the abbreviation of "High Definition DVD". "HD DVD" means a disk having compatibility with the conventional DVD-type disks and having larger memory capacity than that of the conventional DVD-type disks. An infrared laser was used for the conventional CDs. A red laser was used for the conventional DVDs. A bluish-violet laser is however used when reading data/information recorded on the "HD DVD" optical disk 200 or when writing data/information to the "HD DVD" optical disk 200. "Blu-ray" means the bluish-violet laser employed to realize high-density recording, unlike the red laser used for conventional signal read and write.

The optical pickup unit designated at 1 serves to reproduce data recorded on the various optical disks and record data into the recordable or rewritable, various optical disks. The optical pickup or the optical pickup unit is abbreviated to e.g., "OPU". The OPU 1 is intended to support CD-type media, DVD-type media, and Blu-ray-type media. In this manner, the OPU 1 is intended to support plural types of media.

The focusing detection method of converging spots Sb and Sd in this OPU 1 is a detection method based on a differential astigmatism method. The differential astigmatism method is e.g., a method of detecting a point strain formed in an optical system having an astigmatism to thereby detect the displacements or position offsets of the converging spots Sb and Sd. This OPU 1 is one having an optical system based on the differential astigmatism method.

The tracking detection method of the converging spots Sb and Sd in this OPU 1 is a detection method based on a differential push-pull method or a phase difference method. The differential push-pull method is e.g., a method of detecting the displacements or position offsets of the converging spots Sb and Sd using a main beam for data read/write and two subbeams for detecting displacement correction signals. The phase difference method is e.g., a detection method based on phase difference signals detected by four-split photo detectors 19 and 49.

"Focus" means a focal point. "Focusing" means adjusting the focus or bringing into focus. "Tracking" means tracking and observing minute pits (holes, recesses), grooves, and wobbles provided in the signal portions 150 and 250 of the optical disks 100 and 200 by use of light and locating substantially spiral trajectory. The definitions of a focus direction Df and a tracking direction Dt in this specification are definitions given for convenience of describing the OPU.

Description will now be made of an optical path of a laser emitted from a first light-emitting element 10. Current flows from a single laser driver (not shown) to the first light-emitting element 10 to allow the first light-emitting element 10 to output laser light of a first wavelength. More specifically, the single laser driver (not shown) supplies current to the light-emitting element 10 for "HD DVD" or for "Blu-ray Disc" so that the light-emitting element 10 for "HD DVD" or for "Blu-ray Disc" outputs laser light of a wavelength adapted to the "HD DVD" or "Blu-ray Disc" type disks. The first light-emitting element 10 is e.g., a laser diode for "HD DVD" and for "Blu-ray Disc" capable of emitting bluish-violet laser light having a wavelength of about 390 to 420 nm (nanometers) with its reference wavelength of 405 nm. The laser diode is abbreviated to "LD".

The laser driver is called e.g., "LDD". "LDD" is an abbreviation of "LD Driver". The LDD (not shown) is intended to be a laser driving circuit for driving the first LD 10 to cause the first LD 10 to emit laser light of a first wavelength.

An optical path will then be described of laser light emitted from the first LD 10 and applied to the optical disk 100 of the "Blu-ray Disc" standard. As a result of current being supplied from the LDD (not shown) to the first LD 10, information is recorded in the "Blu-ray Disc" standardized optical disk 100 and information recorded in the "Blu-ray Disc" standardized optical disk 100 is reproduced by the action of bluish-violet laser light of a wavelength of 390 to 420 nm emitted from the first LD 10. The first LD 10 is configured as a special LD.

Light emission of the LD induces generation of heat from the LD. Heat generated from the light-emitting LD fluctuates the temperature of the LD itself. The oscillation wavelength of the LD depends on the temperature. For this reason, a fluctuation in the temperature of the LD itself causes a fluctuation in the wavelength of the laser light emitted from the LD. It is preferred that the wavelength of the laser light be kept to substantially a constant wavelength without being fluctuated if possible.

Laser light of the first wavelength outputted from the first LD 10 passes through a first outward-path DOE (Diffractive Optical Element) 12 for "HD DVD" or for "Blu-ray Disc". "DOE" means a diffractive optical element that changes the traveling direction of light by utilizing the light diffraction phenomenon. The DOE is a composite of a special grating and a half-wave plate. "Grating" means a diffraction grating. The diffraction grating is intended to split laser light emitted from the LD into several beams by utilizing diffraction of light. More specifically, the diffraction grating serves to split laser light emitted from the LD into a main beam and two subbeams by utilizing diffraction of light. The half-wave plate acts to change the direction of polarization of linearly polarized light. The half-wave plate is abbreviated to HWP. The half-wave plate is also called a half-lambda plate. When the laser light of the first wavelength passes through the first outward-path DOE 12, the laser light of the first wavelength results in p-linearly polarized light.

"P" of p-wave is an abbreviation of "parallel" in German which means "parallel". "S" of s-wave in contrast with p-wave is an abbreviation of "senkrecht" in German which means "vertical". P-wave and s-wave are properly employed depending on the OPU designing/specifications, etc. After having passed through the first outward-path DOE 12, the first-wavelength laser light in the form of p-linearly polarized light enters a first polarization beam splitter 13. The first polarization beam splitter 13 is configured to allow p-waves to travel substantially straight and pass therethrough but s-waves to reflect at substantially right angles.

The polarization beam splitter is disposed on the optical path of laser light in order to prevent laser light applied to the optical disk from involving astigmatism when laser light emitted from the LD passes through the interior of the polarization beam splitter. The astigmatism means e.g., a focus displacement. The polarization beam splitter is abbreviated to PBS for use. "PBS" is also an abbreviation of "Polarized Beam Splitter" or "Polarizing Beam Splitter".

The first PBS 13 is configured to include a first generally triangular prism-shaped member 13A and a second generally triangular prism-shaped member 13B associated with the first member 13A. The first generally triangular prism-shaped member 13A is associated with the second generally triangular prism-shaped member 13B to make up the first PBS 13 of a generally cubic shape. A special film 13f is disposed between the first member 13A and the second member 13B that make up the first PBS 13 in cooperation. The special film 13f is formed within the interior of the first PBS 13. The special film 13f within the first PBS 13 serves to allow p-waves to travel substantially straight and pass therethrough but s-waves to reflect at substantially right angles.

This allows p-laser light incident on the first PBS 13 to travel substantially straight, pass therethrough, and leave the first PBS. The PBS 13 having the special film 13f therewithin can be e.g., a PBS prism manufactured by TAMRON Inc. After having passed through the first outward-path DOE 12, the first-wavelength laser light in the form of p-linearly polarized light travels substantially straight through the interior of the first PBS 13 and passes therethrough.

After having traveled substantially straight through the interior of the first PBS 13 and passed therethrough, the first-wavelength laser light passes through a first collimator lens for "HD DVD" or for "Blu-ray Disc". The collimator lens serves to convert light incident on the lens from the LD to parallel light for emission. "Parallel light" means light whose rays of light travels endlessly in a parallel relationship without spreading. In contrast, "diffusing light" means light of a light source diffusing light in various directions for irradiation. The collimator lens is abbreviated to "CL".

The first-wavelength laser light converted to the parallel light through a first CL 15 applied to a first reflective mirror 16 for reflecting the first-wavelength light. The first reflective mirror 16 is provided with a film 16f for substantially totally reflecting the laser light. As a result, the laser light applied to the reflective mirror 16 is substantially totally reflected. The reflective mirror having a film for substantially totally reflecting light can be e.g., a total reflection mirror manufactured by NITTO KOHKI Co., Ltd.

The first-wavelength laser light applied to the first reflective mirror 16 is reflected at substantially right angles and passes through a liquid crystal element 50. The liquid crystal element is configured as an active wave plate capable of switching the state of polarization by turning on/off the voltage. "Liquid crystal" means substance in the intermediate status between solid and liquid. The liquid crystal material presents a generally liquid-like fluidity but has an optical anisotropy with regularity in the structure like crystal.

The active wave plate 50 is configured to be of a three-layered structure consisting of a first generally plate-shaped member 50A positioned toward the reflective mirror 16 for reflecting the first-wavelength light, a second generally plate-shaped member 50B positioned toward a dichroic mirror 51, and a third generally plate-shaped member 50C sandwiched between the first member 50A and the second member 50B.

The first member 50A making up the active wave plate 50 is a transmissive member including liquid crystal molecules (not shown). The second member 50B making up the active wave plate 50 is also a transmissive member including liquid crystal molecules (not shown). The third member 50C making up the active wave plate 50 is a transmissive member including electrodes.

The first member 50A making up the active wave plate 50 acts to change incident p-linearly polarized light into s-linearly polarized light for emission when voltage is applied to the liquid crystal molecules within the first member 50A. In contrast, the state of polarization remains unchanged even though s-linearly polarized light is applied to the first member 50A with the voltage being applied to the liquid crystal molecules within the first member 50A. S-linearly polarized light passes intactly through the first member 50A without its state of polarization being changed. The state of polarization remains unchanged even though p-linearly polarized light or s-linearly polarized light is incident on the first member 50A when no voltage is applied to the liquid crystal molecules within the first member 50A. In this case, p-linearly polarized light or s-linearly polarized light is transmitted through the first member 50A without its state of polarization being changed.

The second member 50B making up the active wave plate 50 acts to change incident s-linearly polarized light into p-linearly polarized light for emission when voltage is applied to the liquid crystal molecules within the second member 50B. In contrast, the state of polarization remains unchanged even though p-linearly polarized light is incident on the second member 50B with the voltage being applied to the liquid crystal molecules within the second member 50B. P-linearly polarized light passes intactly through the second member 50B without its state of polarization being changed. The state of polarization remains unchanged even though s-linearly polarized light or p-linearly polarized light is incident on the second member 50B when no voltage is applied to the liquid crystal molecules within the second member 50B. In this case, s-linearly polarized light or p-linearly polarized light is transmitted through the second member 50B without its state of polarization being changed.

When Blu-ray Disc standard optical disk 100 is irradiated with the first-wavelength laser light, voltage is applied to the first member 50A and the second member 50B that make up the active wave plate 50. The first-wavelength laser light in the form of p-linearly polarized light incident on the first member 50A of the active wave plate 50 turns to the first-wavelength laser light in the form of s-linearly polarized light by passing through the voltage-applied first member 50A. The first-wavelength laser light in the form of s-linearly polarized light emitted from the voltage-applied first member 50A then passes through the third member 50C of the active wave plate 50 and enters the voltage-applied second member 50B. The first-wavelength laser light in the form of s-linearly polarized light incident on the second member 50B of the active wave plate 50 changes again into the first-wavelength laser light in the form of p-linearly polarized light by passing through the voltage-applied second member 50B.

Thus, the first-wavelength p-laser light incident on the active wave plate 50 is emitted intactly as the first-wavelength p-laser light from the active wave plate 50 without its state of polarization being changed. The first-wavelength p-laser Light transmitted through the active wave plate 50 reaches the dichroic mirror 51.

The front side of the dichroic mirror 51 is defined as the side of the dichroic mirror 51 toward the active wave plate 50 or toward a photo receptor 59. The back side of the dichroic mirror 51 is defined as the side of the dichroic mirror 51 toward expander lenses 53 and 54 or toward a reflective mirror 46 for CD/DVD. The definition of "front" and "back" of the dichroic mirror 51 in this specification are convenient definitions for descriptive explanation of the OPU 1 provided with the dichroic mirror 51.

A reflection preventing film 51fa is disposed on a front face 51a of the dichroic mirror 51. In case of forming the reflection preventing film 51fa on the front face 51a of the mirror 51, the reflection preventing film 51fa is formed on the front face 51a of the mirror 51 by use of AR coating (Anti Reflection Coating). For example, magnesium fluoride ($MgF_2$) is vacuum vapor deposited on the front face 51a of the mirror 51 to form a transparent thin film 51fa. Interference of light is utilized with the formation of the transparent thin film 51fa to cancel other light.

For example, when other light is directed to and applied to the front face 51a of the dichroic mirror 51, the other light is split into light reflected on the surface of the film 51fa disposed on the front face 51a of the dichroic mirror 51 and light passing through the film 51fa disposed on the front face 51a of the dichroic mirror 51 and reflecting at the depth of the film 51fa. The light reflected on the surface of the film 51fa and the light passing through the film 51fa and reflecting at the depth of the film 51fa have opposite phases to each other shifted by one-half wavelength. For this reason, the light reflected on the surface of the film 51fa and the light passing though the film 51fa and reflecting at the depth of the film 51fa cancel each other. The front face 51a of the dichroic mirror 51 having the reflection preventing film 51fa is formed as a smooth glossy surface.

When the first-wavelength-laser light is applied from the active wave plate 50 to the front face 51a of the dichroic mirror 51, the first-wavelength p-laser light travels through the front side 51 of the dichroic mirror 51 into an interior 51n of the dichroic mirror 51 and toward the back face 51b of the dichroic mirror 51. The front face 51a of the dichroic mirror 51 is provided with the reflection preventing film 51fa for preventing reflection of the bluish-violet first-wavelength laser light having a wavelength of about. 390 to 420 nm. Most of the first-wavelength p-laser light is directed from the back face 51b of the dichroic mirror 51 toward the beam expander lenses 53 and 54. Part of the first-wavelength p-laser light however internally reflects from a special film 51fb on the back face 51b of the dichroic mirror 51 and again passes through the interior 51n of the dichroic mirror 51 to emerge from the front face 51a of the dichroic mirror 51 to thereafter be applied to the photo receptor 59.

About 5 to 15% of light of laser light incident on the front face 51a of the dichroic mirror 51 is directed toward the photo receptor 59. About 85 to 95% of light of the laser light incident on the front face 51a of the dichroic mirror 51 is directed toward the beam expander lenses 53 and 54. When laser light is incident on the front face 51a of the dichroic mirror 51 and applied to the special film 51fb on the back face 51b of the dichroic mirror 51, the quantity of light required to apply laser light to the optical disk 100 comes short if the quantity of transmission of laser light through the dichroic mirror 51 is less than 85% for example, namely, if the quantity of reflection of the laser light on the dichroic mirror 51 is more than 15% for example.

When laser light is incident on the front face 51a of the dichroic mirror 51 and applied to the special film 51fb on the back face 51b of the dichroic mirror 51, the quantity of reception of laser light required for the photo receptor 59 comes short if the quantity of transmission of laser light through the dichroic mirror 51 is more than 95% for example, namely, if the quantity of reflection of the laser light on the dichroic mirror 51 is less than 5% for example.

When laser light is incident on the front face 51a of the dichroic mirror 51 and applied to the special film 51fb on the back face 51b of the dichroic mirror 51, an adequate quantity of laser light is applied to the optical disk 100 and a proper quantity of laser light required for the photo receptor 59 is emitted if the quantity of transmission of laser light through the dichroic mirror 51 is 90% for example, namely, if the quantity of reflection of the laser light on the dichroic mirror 51 is 10% for example. It is therefore preferred that the dichroic mirror 51 having such characteristics be mounted on the OPU 1.

The dichroic mirror is configured to have the special film 51*fb* forming a dichroic filter. The dichroic film 51*fb* with a wavelength selectivity is formed on the back face 51*b* of the dichroic mirror 51. "Dichroic" means having two different hues. The dichroic mirror is abbreviated to dichro-mirror, etc. The dichroic filter is abbreviated to dichro-filter, etc. The dichroic film is abbreviated to dichro-film, etc.

The dichro-film 51*fb* transmits most of the laser light (first-wavelength laser light) for "HD DVD" or for "Blu-ray Disc" having a wavelength of about 390 to 420 nm, reflects laser light (second-wavelength laser light) for DVD having a wavelength of about 630 to 685 nm, and reflects laser light (third-wavelength laser light) for CD having a wavelength of about 770 to 830 nm. The dichroic mirror 51 is formed to transmit most of the first-wavelength laser light having the wavelength of about 390 to 420 nm and to internally reflect part of the first-wavelength laser light having the wavelength of about 390 to 420 nm.

The back face 51*b* of the dichroic mirror 51 provided with the dichro-film 51*fb* is formed as a smooth glossy surface. The dichroic mirror 51 having the special film 51*fb* on its surface 51*b* can be e.g., a dichroic mirror manufactured by TAMRON, Inc.

The photo receptor is configured as a front monitor diode irradiated with part of laser light. The front monitor diode is abbreviated to "FMD". The FMD serves to monitor laser light outputted from the LD to give a feedback for LD control. The first-wavelength p-laser light transmitted through the dichroic mirror 51 passes through the concave beam expander lens 53 and the convex beam expander lens 54. The beam expander lenses are displaceable relative to each other to vary the laser light to a desired beam diameter. For example, the convex beam expander lens 54 is displaced relative to the fixed concave beam expander lens 53 along the direction of the optical axis of the beam expander lenses 53 and 54 using a displacing motor (not shown), to thereby vary the laser light to a desired beam diameter.

The pair of beam expander lenses 53 and 54 are required when recording data on the Blu-ray Disc standard optical disk 100 and when reproducing data recorded on the Blu-ray Disc standard optical disk 100.

For example, thicknesses 110*t* and 120*t* at substrates 110 and 120 of the optical disk 100 for "Blu-ray Disc" are different from thicknesses 210*t* and 220*t* at substrates 210 and 220 of the "HD DVD" type optical disk 200. The "Blu-ray Disc" use optical disk 100 and the "HD DVD" type optical disk 200 are different from each other in the position of focal point of spots Sb and Sd of laser light applied and formed onto the signal portions 150 and 250 of the optical disks 100 and 200 on the optical axis along the focus direction Df. A working distance WDb of a first objective lens 69 for the optical disk 100 is different from a working distance WDd of a second objective lens 79 for the optical disk 200. In order to apply and form high-accuracy converging spots Sb and Sd onto the various optical disks to deal with such facts there is a need to dispose the pair of beam expander lenses 53 and 54 on the OPU 1. In this manner, this OPU 1 is configured to be provided with the pair of expander lenses 53 and 54 that vary the laser light to a predetermined beam diameter. The first-wavelength p-laser light transmitted through the beam expander lenses 53 and 54 reaches a polarizing mirror 56.

The front side of the polarizing mirror 56 is defined as a face toward the beam expander lenses 53 and 54 or as a face toward a liquid crystal correction element 70. The back side of the polarizing mirror 56 is defined as a face toward a reflective mirror 66 for "Blu-rayDisc". The definitions of the "front" and "back" of the polarizing mirror 56 in this specification are convenient definitions for descriptive explanation of the OPU 1 provided with the polarizing mirror 56.

A front face 56*a* of the polarizing mirror 56 is disposed with a special polarizing film 56*f* that allows bluish-violet first-wavelength p-laser light for "Blu-ray Disc" having a wavelength of about 390 to 420 nm to travel substantially straight and pass therethrough while reflecting bluish-violet first-wavelength s-laser light for "HD DVD" having a wavelength of about 390 to 420 nm at substantially right angles.

The first-wavelength p-laser light therefore passes through the polarizing mirror 56. When p-laser light is applied from the beam expander lenses 53 and 54 to the front face 56*a* of the polarizing mirror 56, p-laser light travels from the front face 56*a* of the polarizing mirror 56 through an interior 56*n* of the polarizing mirror 56 and leaves the back face 56*b* of the polarizing mirror 56 toward the reflective mirror 66. When s-laser light is applied from the beam expander lenses 53 and 54 to the front face 56*a* of the polarizing mirror 56, s-laser light is reflected at substantially right angles from the front face 56*a* of the polarizing mirror 56 to travel toward the liquid crystal correcting element 70.

The front face 56*a* of the polarizing mirror 56 disposed with the special polarizing film 56*f* is formed as a smooth glossy surface. The back face 56*b* of the polarizing mirror 56 is also formed as a smooth glossy surface.

When laser light (second-wavelength laser light) for DVD with a wavelength of about 630 to 685 nm or laser light (third-wavelength laser light) for CD with a wavelength of about 770 to 830 nm is applied to the special polarizing film 56*f* disposed on the front face 56*a* of the polarizing mirror 56, the laser light (second-wavelength laser light) for DVD or the laser light (third-wavelength laser light) for CD is reflected thereon. The special polarizing film 56*f* disposed on the front face 56*a* of the polarizing mirror 56 acts to reflect the laser light (second-wavelength laser light) for DVD with a wavelength of about 630 to 685 nm and the laser light (third-wavelength laser light) for CD irrespective of whether the laser light is p-wave or s-wave. The polarizing mirror 56 with the special film 56*f* disposed on its front face 56*a* can be a filmed mirror manufactured by TAMRON Inc.

The first-wavelength p-laser light transmitted through the polarizing mirror 56 reflects at substantially right angles from the reflective mirror 66 for Blu-ray Disc and passes through the first objective lens 69. The reflective mirror 66 for Blu-ray Disc is provided with a film 66*f* that substantially totally reflects laser light. Thus, laser light striking on the reflective mirror 66 for Blu-ray Disc is substantially totally reflected thereon.

The objective lens serves to converge laser light emitted from the LD onto the optical disk. The objective lens is abbreviated to "OBL". The first-wavelength p-laser light converged through the first objective lens 69 is applied to the signal portion 150 of the Blu-ray Disc standard optical disk 100.

When the optical disk 100 is subjected to focus servo of the first OBL 69 mounted on a lens holder (not shown), the lens holder mounted with the first OBL 69 is displaced along the focus direction Df. When the optical disk 100 is subjected to tracking servo of the first OBL 69 mounted on the lens holder (not shown), the lens holder mounted with the first OBL 69 is displaced along the tracking direction Dt. When the optical disk 100 is subjected to tilt control of the first OBL 69 mounted on the lens holder, the lens holder mounted with the first OBL 69 is tilted. The lens holder mounted with the first OBL 69 is driven by use of a plurality of wires (not shown). Adjacent to the first OBL 69, the second OBL 79 is mounted on the lens holder (not shown).

The first-wavelength laser light entering the front face 56a of the polarizing mirror 56 and leaving the back face 56b of the polarizing mirror 56 is reflected substantially right angles on the reflective mirror 66 for Blu-ray Disc and then is converged through the first OBL 69 onto the signal portion 150 of the Blu-ray Disc standard optical disk 100. The first-wavelength p-laser light travels along such an outward path and converges on the Blu-ray Disc standard optical disk 100.

A return path will then be described of the first-wavelength p-laser light reflected on the "Blu-ray Disc" standard optical disk 100. The first-wavelength p-laser light reflected on the signal portion 150 of the "Blu-ray Disc" standard optical disk 100 passes through the first OBL 69 and reflects at substantially right angles from the third reflective mirror 66. The reflective mirror 66 for Blu-ray Disc is herein referred to as e.g., third reflective mirror 66. The first-wavelength p-laser light reflected at substantially right angles from the third reflective mirror 66 travels substantially straight through the interior of the polarizing mirror 56 and passes through the convex beam expander lens 54 and the concave beam expander lens 53 to reach the dichroic mirror 51.

When the first-wavelength p-laser light is applied from the beam expander lenses 53 and 54 to the back face 51b of the dichroic mirror 51, most of the first-wavelength p-laser light passes through the interior 51n of the dichroic mirror 51 and emerges from the front face 51a of the dichroic mirror 51.

The first-wavelength p-laser light on the return path travels substantially straight through the interior of the dichroic mirror 51 to reach the active wave plate 50. The first-wavelength laser light in the form of p-linearly polarized light on the return path is first incident on the voltage-applied second member 50B making up the active wave plate 50. The second member 50B serves to prevent the state of polarization from changing even though p-linearly polarized light is incident thereon with the voltage applied to liquid crystal molecules therein. Thus, the first-wavelength laser light on the return path passes as p-linearly polarized light intactly through the second member 50B of the active wave plate 50.

The first-wavelength laser light in the form of p-linearly polarized light on there turn path then passes through the third member 50C of the active wave plate 50 and is incident on the voltage-applied first member 50A making up the active wave plate 50. The first member 50A of the active wave plate 50 acts to change incident p-linearly polarized light into s-linearly polarized light for emission when voltage is applied to liquid crystal molecule within the first member 50A. Therefore, the first-wavelength laser light in the form of p-linearly polarized light on the return path incident on the first member 50A of the active wave plate 50 is changed into laser light in the form of s-linearly polarized light which is in turn emitted from the first member 50A of the active wave plate 50.

The first-wavelength s-laser light on the return path emitted from the active wave plate falls on the first reflective mirror 16. The first-wavelength s-laser light on the return path reflected at substantially right angles from the first reflective mirror 16 passes through the first CL 15 to reach the first PBS 13. The first-wavelength s-laser light on the return path is refracted at substantially right angles within and passes through the first PBS 13 to reach a first sensor lens 18 for "Blu-ray Disc" or for "HD DVD".

The first-wavelength laser light on the return path passes through the first sensor lens 18 for "Blu-ray Disc" or for "HD DVD". The sensor lens generates astigmatism of laser light. Optical aberration means for example that a defective image is created since rays of light passing through a lens do not correctly converge on a single focal point. The astigmatism means difference in the focal points. The sensor lens is also called power lens or anamorphic lens (anarmo-lens).

The first-wavelength laser light on the return path transmitted through the first sensor lens 18 is applied to the first PDIC 19 for "Blu-ray Disc" or for "HD DVD". The PDIC is a photo detector for receiving laser light reflected on an optical disk to convert its signal into an electrical signal to thereby operate a servo mechanism (not shown) of the lens holder with OBL (not shown) making up the optical pickup unit. The photo detector or photo diode IC is abbreviated to "PD" or "PDIC".

The optical path will then be described of laser light emitted from the first LD10 to be applied to the "HD DVD" standard optical disk 200. By the action of bluish-violet laser light with a wavelength of 390 to 420 nm emitted from the LD10 as a result of current being supplied from the LDD (not shown) to the first LD 10, information is recorded on the "HD DVD" standard optical disk 200 or information recorded on the "HD DVD" standard optical disk 200 is reproduced.

The first-wavelength laser light outputted from the first LD 10 passes through the first outward-path DOE 12 for "HD DVD" or for "Blu-ray Disc". On having passed through the first outward-path DOE 12, the first-wavelength laser light turns to p-linearly polarized light. The first-wavelength laser light in the form of p-linearly polarized light transmitted through the first outward-path DOE 12 travels substantially straight through the interior of the first PBS 13 and passes therethrough. The first-wavelength laser light transmitted substantially straight through the first PBS 13 passes through the first CL 15 for "HD DVD" or for "Blu-ray Disc". The first-wavelength laser light changed into parallel light as a result of having passed through the first CL 15 is applied to the first reflective mirror 16 for reflection of the first-wavelength light. The first-wavelength laser light incident on the first reflective mirror 16 is reflected at substantially right angles to pass through the active wave plate 50.

When the "HD DVD" standard optical disk 200 is irradiated with the first-wavelength laser light, voltage is applied to the first member 50A of the active wave plate 50. At that time, however, no voltage is applied to the second member 50B of the active wave plate 50. The first-wavelength laser light in the form of p-linearly polarized light incident on the first member 50A of the active wave plate 50 turns to the first-wavelength laser light in the form of s-linearly polarized light by passing through the voltage-applied first member 50A. The first-wavelength laser light in the form of s-linearly polarized light transmitted through the voltage-applied first member 50A then passes through the third member 50C of the active wave plate 50 to strike on the second member 50B of the active wave plate 50. Since the second member 50B of the active wave plate 50 is not subjected to voltage, the first-wavelength laser light in the form of s-linearly polarized light incident on the second member 50B of the active wave plate 50 is emitted intactly as laser light in the form of s-linearly polarized light from the second member 50B of the active wave plate 50 without the state of polarization being changed.

Thus, the first-wavelength p-laser light incident on the active wave plate 50 is polarized into the first-wavelength s-laser light for emission from the active wave plate 50. The first-wavelength laser light changed into s-waves as a result of having passed through the active wave plate 50 reaches the dichroic mirror 51.

When the first-wave s-laser light is applied from the active wave plate 50 to the front face 51a of the dichroic mirror 51, the first-wave s-laser light travels from the front face 51a of the dichroic mirror 51 through the interior 51n of the dichroic mirror 51 toward the back face 51b of the dichroic mirror 51. Most of the first-wavelength s-laser light is emitted from the back face 51b of the dichroic mirror 51 toward the beam expander lenses 53 and 54. Part of the first-wavelength s-laser light is however internally reflected on the special film 51fb on the back face 51b of the dichroic mirror 51 to again traverse the interior 51n of the dichroic mirror 51, after which it is sent forth from the front face 51a of the dichroic mirror 51 to be applied to the FMD 59.

The first-wavelength s-laser light transmitted through the dichroic mirror 51 reaches the concave beam expander lens 53 and the convex beam expander lens 54. The displacing motor (not shown) is used for example to displace the convex beam expander lens 54 relative to the fixed concave beam expander lens 53 along the direction of the optical axis of the beam expander lenses 53 and 54, to thereby perform spot corrections of the laser light to deal with "dispersions" in the thicknesses of the optical disks, fluctuations in the wavelength of the laser light, and spherical aberrations arising from the temperature fluctuations. That is, the convex beam expander lens 54 is displaced relative to the fixed concave beam expander lens 53 along the direction of the optical axis of the beam expander lenses 53 and 54, to thereby perform corrections of spots of laser light formed on the signal portion 250 of the optical disk 200. The spherical aberration means an aberration on the optical axis in which parallel rays of light apart from the axis or rays of monochromatic light sent forth from one point on the axis do not converge on a single point on the axis when they pass through the optical system.

Further, the convex beam expander lens 54 is displaced relative to the fixed concave beam expander lens 53 along the direction of the optical axis of the beam expander lenses 53 and 54, the spherical aberration can be corrected to a minimum which may occur on the optical disk for "HD DVD" (not shown) having three-layered signal faces (not shown) or on the optical disk for "Blu-ray Disc" (not shown) having four-layered signal faces (not shown).

The beam expander lenses 53 and 54 are configured such that one or both of the concave beam expander lens 53 and the convex beam expander lens 54 is (are) displaceable along the direction of the optical axis of the beam expander lenses 53 and 54.

The first-wavelength s-laser light transmitted through the concave beam expander lens 53 and the convex beam expander lens 54 reaches the polarizing mirror 56.

The first-wavelength s-laser light is reflected at substantially right angles from the polarizing mirror 56 to pass through the liquid crystal correcting element 70. The liquid crystal correcting element 70 is capable of controlling the liquid crystal molecules as desired. By use of the liquid crystal correcting element, occurrence of the aberration such as coma or spherical aberration can be suppressed when the laser light is applied to the optical disk. The coma means a phenomenon in which when light incident obliquely from an object point apart from the optical axis is imaged through a lens, it does not converge on a single point but spreads out like e.g., a comet.

In this manner, the liquid crystal correcting element 70 is provided that suppresses occurrence of the aberration such as coma or spherical aberration on a converging spot Sd formed on the signal portion 250 of the optical disk 200 when the first-wavelength laser light is applied to the optical disk 200. The liquid crystal correcting element 70 works effectively for the bluish-violet laser light (first-wavelength laser light) for "HD DVD" with a wavelength of 390 to 420 n.

The first-wavelength s-laser light transmitted through the liquid crystal correcting element 70 passes through a wideband quarter-wave plate 74 with aperture limit. The quarter-wave plate is abbreviated to QWP. The wideband quarter-wave plate 74 with aperture limit acts on laser light (third-wavelength laser light) for CD with a wavelength of about 770 to 830 nm and on laser light (second-wavelength laser light) for DVD with a wavelength of about 630 to 685 but does not act on the bluish-violet laser light (first-wavelength laser light) for "HD DVD" with a wavelength of about 390 to 420 nm. Accordingly, the bluish-violet first-wavelength s-laser light with a wavelength of about 390 to 420 nm doe not undergo a great change even though the first-wavelength s-laser light passes through the QWP 74. In this manner, this OPU 1 is configured to include the wideband QWP 74 with aperture limit that acts on the second-wavelength laser light and/or the third-wavelength laser light without acting on the first-wavelength laser light.

The first-wavelength s-laser light transmitted through the QWP 74 passes through the second OBL 79 to be applied to the signal portion 250 of the "HD DVD" standard optical disk 200.

When subjecting the optical disk 200 to focus servo of the second OBL 79 mounted on the lens holder (not shown), the lens holder mounted with the second OBL 79 is displaced along the focus direction Df. When subjecting the optical disk 200 to tracking servo of the second OBL 79 mounted on the lens holder (not shown), the lens holder mounted with the second OBL 79 is displaced along the tracking direction Dt. When subjecting the optical disk 200 to tilt control of the second OBL 79 mounted on the lens holder (not shown), the lens holder mounted with the second OBL 79 is tilted. A plurality of wires (not shown) are used to drive the lens holder mounted with the second OBL 79.

The first-wavelength laser light applied to and reflected on the front face 56a of the polarizing mirror 56 passes through the liquid crystal correcting element 70 and the QWP 74, after which it is converged through the second OBL 79 onto the signal portion 250 of the "HD DVD" standard optical disk 200. Following such an outward path, the first-wavelength s-laser light converges on the "HD DVD" standard optical disk 200.

The return path will then be described of the first-wavelength s-laser light reflected on the "HD DVD" standard optical disk 200. The first-wavelength s-laser light reflected on the signal portion 250 of the "HD DVD" standard optical disk 200 passes through the second OBL 79, through the QWP 74, and through the liquid crystal correcting element 70, and reflects at substantially right angles from the polarizing mirror 56, after which it passes through the convex beam expander lens 54 and the concave beam expander lens 53 to reach the dichroic mirror 51.

When the first-wavelength s-laser light is applied from the beam expander lenses 53 and 54 to the back face 51b of the dichroic mirror 51, most of the first-wavelength s-laser light passes through the interior 51n of the dichroic mirror 51 and emerges from the front face 51a of the dichroic mirror 51.

The first-wavelength s-laser light on the return path travels substantially straight through the interior of the dichroic mirror 51 and passes therethrough to reach the active wave plate 50. The first-wavelength laser light in the form of s-linearly polarized light on the return path first strikes on the second member 50B making up the active wave plate 50. When the first-wavelength laser light is applied to the "HD DVD" standard optical disk 200, no voltage is applied to the second member 50B of the active wave plate 50. In consequence, the first-wavelength laser light on the return path passes as s-linearly polarized light intactly through the second member 50B of the active wave plate 50.

The first-wavelength laser light in the form of s-linearly polarized light on the return path then passes through the third member 50C of the active wave plate 50 to strike on the voltage-applied first member 50A making up the active wave plate 50. The first member 50A is configured so as not to cause a change in the state of polarization even though the s-linearly polarized light is incident on the first member 50A with voltage being applied to liquid crystal molecules therewithin. Consequently, the first-wavelength laser light in the form of s-linearly polarized light on the return path emerges as the s-linearly polarized light intactly from the first member 50A of the active wave plate 50 without its state of polarization being changed.

The first-wavelength s-laser light on the return path sent forth from the active wave plate 50 is applied to the first reflective mirror 16. The first-wavelength s-laser light reflected at substantially right angles from the first reflective mirror 16 passes through the first CL 15 to reach the first PBS 13. The first-wavelength s-laser light on the return path is refracted at substantially right angles within and passes through the first PBS 13 to reach the first sensor lens 18 for "Blu-ray Disc" or for "HD DVD". The first-wavelength laser light on the return path passes through the first sensor lens 18 for "Blu-ray Disc" or for "HD DVD" to be applied to the first PDIC 19 for "Blu-ray Disc" or for "HD DVD".

Description will then be made of an optical path of laser emitted from a second light-emitting element 20. Current is supplied from the LDD to the second light-emitting element 20 so that laser light of a second-wavelength is issued from the second light-emitting element 20. More detailedly, current flows from the LDD to the light-emitting element 20 for DVD to allow the light-emitting element 20 for DVD to output laser light with a wavelength adapted to the DVD type disks. The second light-emitting element 20 is a laser diode for DVD capable of emitting red laser light having a wavelength of about 630 to 685 nm with its reference wavelength of about 635 nm or about 650 nm for example.

By the action of the red laser light with a wavelength of 630 to 685 nm issued from the second LD 20 as a result of supply of current from the LDD to the second LD 20, information is recorded on the DVD-standard optical disk 200 or information recorded on the DVD-standard optical disk 200 is reproduced.

The second-wavelength laser light outputted from the second LD 20 passes through a second outward-path DOE 22. At that time, the second-wavelength laser light turns to s-linearly polarized light. The second-wavelength laser light in the form of s-linearly polarized light transmitted through the second outward-path DOE 22 is incident on a second PBS 23. The second PBS 23 is configured to reflect s-waves at substantially right angles therewithin and to allow p-waves to traverse substantially straight and pass therethrough.

The second PBS 23 is configured to include a first generally triangular prism-shaped member 23A and a second generally triangular prism-shaped member 23B meshing with the first member 23A. The second generally triangular prism-shaped member 23A is meshed with the second generally triangular prism-shaped member 23B to make up the second PBS 23 of a generally cubic shape. A special film 23f is disposed between the first member 23A and the second member 23B that make up the second PBS 23 in cooperation. The special film 23f is formed within the interior of the second PBS 23. The special film 23f within the second PBS 23 serves to reflect s-waves at substantially right angles but to allow p-waves to travel substantially straight and pass therethrough.

This allows s-laser light incident on the second PBS 23 to reflect at substantially right angles within the interior of the second PBS 23 and pass therethrough to leave the second PBS 23. P-laser light incident on the second PBS 23 traverses substantially straight and passes through the interior of the second PBS 23 to leave the second PBS 23. The PBS 23 having the special film 23f therewithin can be e.g., a PBS prism manufactured by TAMRON Inc. After having passed through the second outward-path DOE 22, the second-wavelength laser light in the form of s-linearly polarized light is refracted at substantially right angles within the interior of the second PBS 23 to pass therethrough.

After having been refracted at substantially right angles and passed through the interior of the second PBS 23, the second-wavelength laser light reaches a third PBS 33 for DVD or for CD. The second-wavelength laser light incident on the third PBS 33 traverses substantially straight and passes through the interior of the third PBS 33. The third PBS 33 is configured to allow the second-wavelength laser light with a wavelength of about 630 to 685 nm to traverse substantially straight and pass through the interior of the PBS 33.

A special film 33f is disposed within the third PBS 33. The special film 33f acts to allow laser light for DVD with a wavelength of about 630 to 685 nm to pass therethrough. By virtue of the disposition of the special film 33f within the third PBS 33, the third PBS 33 exhibits different characteristics depending on the wavelength, i.e., on whether it is the wavelength for CD or the wavelength for DVD. The third PBS 33 is also called a dichroic prism. The film disposed within the dichroic prism is called e.g., a dichroic film.

After having traversed substantially straight and passed through the interior of the third PBS 33, the second-wavelength laser light passes through a second CL 45 for DVD or for CD to be applied to the second reflective mirror 46 for reflecting the second-wavelength light or third wavelength light. The second reflective mirror 46 is provided with a film 46f for substantially totally reflecting laser light. Accordingly, laser light incident on the reflective mirror 46 is substantially totally reflected therefrom. The second-wavelength laser light reflected on the second reflective mirror 46 is applied to the dichroic mirror 51.

When the second-wavelength laser light is applied from the second reflective mirror 46 to the back face 51b of the dichroic mirror 51, most of the second-wavelength laser light is reflected on the back face 51b of the dichroic mirror 51 to travel toward the beam expander lenses 53 and 54. Some of the second-wavelength laser light however passes from the back face 51b of the dichroic mirror 51 through the interior 51n of the dichroic mirror 51 to emerge from the front face 51a of the dichroic mirror 51 to strike on the FMD 59.

The dichroic mirror 51 is formed to reflect most of the second-wavelength laser light with a wavelength of 630 to 685 nm and to allow some of the second-wavelength laser light to pass therethrough.

The second-wavelength laser light reflected at substantially right angles on the dichroic mirror 51 passes through the concave beam expander lens 53 and the convex beam expander lens 54 to reach the polarizing mirror 56.

The second-wavelength laser light is reflected at substantially right angles on the polarizing mirror 56 and is transmitted through the liquid crystal correcting element 70 to pass through the wideband quarter-wave plate 74. The quarter-wave plate 74 is required for the OPU 1 of DVD recording type.

The quarter-wave plate 74 serves to change linearly polarized light into circularly polarized light or to change circularly polarized light into linearly polarized light. Since the linearly polarized light is changed into circularly polarized light with laser light between the quarter-wave plate and an optical disk being changed into circularly polarized light, data recording/reproducing operations for the optical disk can normally be carried out even though the optical disk is coarse for example. By changing the linearly polarized light into circularly polarized light and changing laser light between the quarter-wave plate and an optical disk into circularly polarized light, characteristics are improved when data write/reproduction is carried out for the optical disk. The quarter-wave plate is also called quarter-lambda plate. Some types of OPUs (not shown) include no quarter-wave plates intervening on the optical path.

The wideband quarter-wave plate with aperture limit 74 serves to transmit laser light for DVD (second-wavelength laser light) with a wavelength of about 630 to 685 nm and to mask laser light for CD (third-wavelength laser light) with a wavelength of about 770 to 830 nm. For example, when red second-wavelength laser light for DVD with a wavelength of about 630 to 685 nm passes through the wideband quarter-wave plate with aperture limit 74, the second-wavelength laser light is not subjected to phase correction. The second-wavelength laser light transmitted through the wideband quarter-wave plate with aperture limit 74 is narrowed down by the OBL 79 having a numerical aperture of about 0.6. The numerical aperture refers to the product of the sine of the angle relative to the optical axis when viewing the effective radius (the radius of the entrance pupil) of the objective lens from an object point in an optical instrument and the refractive index of the medium in front of the objective lens. The numerical aperture is abbreviated to "NA". The numerical aperture is used to represent the performance of the objective lens.

On having passed through the wideband quarter-wave plate with aperture limit 74, the second-wavelength laser light in the form of s-linearly polarized light turns to circularly polarized light. The second-wavelength laser light in the form of s-linearly polarized light turns to e.g., right-hand (clockwise) circularly polarized light through the wideband quarter-wave plate with aperture limit 74. The right-hand circularly polarized light is referred to herein as e.g., forward-rotating circularly polarized light. The second-wavelength laser light in the form of the right-hand circularly polarized light passes through the second OBL 79 to be applied to the signal portion 250 of the DVD-standard optical disk 200. The second-wavelength laser light applied to and reflected on the front face 56a of the polarizing mirror 56 traverses the liquid crystal correcting element 70 and passes through the wideband quarter-wave plate with aperture limit 74, changing into right-hand circularly polarized light, which in turn converges on the signal portion 250 of the DVD-standard optical disk 200 via the second OBL 79. Following such a path, the second-wavelength laser light is converged on the DVD-standard optical disk 200.

Description will then be made of a return path of the second-wavelength laser light reflected on the DVD-standard optical disk 200. When the second-wavelength laser light reflects from the DVD-standard optical disk 200, the second-wavelength laser light in the form of right-hand circularly polarized light turns to left-hand (counterclockwise) circularly polarized light. The left-hand circularly polarized light is referred to herein as reverse-rotating circularly polarized light. The second-wavelength laser light in the form of the left-hand circularly polarized light traverses the second OBL 79 and passes through the wideband quarter-wave plate with aperture limit 74. On having passed through the wideband quarter-wave plate with aperture limit 74, the second-wavelength laser light in the form of the left-hand circularly polarized light turns to p-linearly polarized light. The second-wavelength laser light in the form of the p-linearly polarized light transmitted through the wideband quarter-wave plate with aperture limit 74 traverses the liquid crystal correcting element 70 and reflects at substantially right angles on the polarizing mirror 56, after which it traverses the convex beam expander lens 54 and the concave beam expander lens 53 to reach the dichroic mirror 51.

When the second-wavelength laser light is applied from the beam expander lenses 53 and 54 to the back face 51b of the dichroic mirror 51, most of the second-wavelength laser light is reflected toward the second reflective mirror 46. The second-wavelength laser light on the return path reflects at substantially right angles on the dichroic mirror 51 and is applied to the reflective mirror 46.

The second-wavelength laser light in the form of p-linearly polarized light on the return path reflected from the second reflective mirror 46 travels substantially straight through the interior of the second CL 45 and further travels substantially straight through the interior of the PBS 33 reaching a second sensor lens 48 for DVD or for CD. The second-wavelength laser light on the return path passes through the second sensor lens 48 for DVD or for CD to be applied to the second PDIC 49 for DVD or for CD.

An optical path of laser issued from a third light-emitting element 30 will be described hereinbelow. When current flows from the LDD to the third light-emitting element 30, laser light of a third wavelength is outputted from the third light-emitting element 30. More specifically, current is supplied from the LDD to the light-emitting element 30 for CD, with the result that laser light of a wavelength adapted to the CD-type disk is emitted from the light-emitting element 30 for CD. The third light-emitting element 30 is a laser diode for CD capable of emitting laser light having a wavelength of about 770 to 830 nm with its reference wavelength of about 780 nm for example.

By the action of laser light with a wavelength of 770 to 830 nm emitted from the third LD 30 as a result of supply of current from the LDD to the third LD 30, information is recorded on the CD-standard optical disk or information recorded on the CD-standard optical disk is reproduced.

The third-wavelength laser light outputted from the third LD 30 first passes through a divergent lens 31. The divergent lens servers to gather laser light emitted from the LD. The divergent lens is sometimes called e.g., a coupling lens or an intermediate lens for handling.

The third-wavelength laser light transmitted through the divergent lens 31 passes through a third outward-path DOE 32. At that time, the third-wavelength laser light turns to s-linearly polarized light. The third-wavelength laser light in the form of s-linearly polarized light transmitted through the third outward-path DOE 32 is incident on the third PBS 33.

The third-wavelength laser light in the form of S-linearly polarized light transmitted through the third outward-path DOE 32 reaches the third PBS 33 for DVD or for CD. The third-wavelength laser light is refracted at substantially right angles within the interior of the third PBS 33 to pass therethrough. The third PBS 33 is configured to reflect s-waves at substantially right angles within the interior of the third PBS 33 and to allow p-waves to travel substantially straight within the interior of the third PBS 33 to pass therethrough. The third PBS 33 exhibits different characteristics depending on whether the laser light is the third-wavelength laser light for CD or the second-wavelength laser light for DVD.

The third PBS 33 is configured to include a first generally triangular prism-shaped member 33A and a second generally triangular prism-shaped member 33B meshing with the first member 33A. The first generally triangular prism-shaped member 33A is meshed with the second generally triangular prism-shaped member 33B to makeup the third PBS 33 of a generally cubic shape. A special film 33f is disposed between the third member 33A and the second member 33B that make up the third PBS 33 in cooperation. The dichro-film 33f is formed within the interior of the third PBS 33. Within the third PBS 33 is disposed the dichro-film 33f for reflecting third-wavelength s-laser light at substantially right angles and allowing third-wavelength p-laser light to travel substantially straight and pass therethrough. The third PBS 33 is configured to reflect third-wavelength s-laser light at substantially right angles within the third PBS 33 and to allow third-wavelength p-laser light to travel substantially straight within the third PBS 33 and pass therethrough.

This allows third-wavelength s-laser light incident on the third PBS 33 to reflect at substantially right angles within the interior of the third PBS 33 to pass through the interior of the third PBS to leave the third PBS 33. The third-wavelength p-laser light incident on the third PBS 33 travels substantially straight and passes through the interior of the third PBS 33 to leave the third PBS 33. The PBS 33 having the special film 33f therewithin can be e.g., a dichroic prism manufactured by TAMRON Inc. After having passed through the third outward-path DOE 32, the third-wavelength laser light in the form of s-linearly polarized light is refracted at substantially right angles within the interior of the third PBS 33 for DVD and CD to pass therethrough.

The special films such as the dichro-films 33f and 51fb, and the polarizing film 56f are formed on desired surfaces by using e.g., vacuum deposition, sputtering, etc. The special films such as the dichro-films 33f and 51fb, and the polarizing film 56f are formed as layers each containing at least one or more substances selected from a group consisting of $SiO_2$, $ZnO_2$, $TiO_2$ and $Ti_2O_5$. More specifically, the dichro-films 33f and 51fb, and the polarizing film 56f are configured as thin layers each containing at least one or more substances selected from a group consisting of $SiO_2$, $ZnO_2$, $TiO_2$ and $Ti_2O_5$.

The third-wavelength laser light refracted at substantially right angles within the third PBS 33 and transmitted therethrough passes through the second CL 45 for DVD or for CD to be applied to the second reflective mirror 46 for reflecting second-wavelength light or third-wavelength light. The third-wavelength laser light reflected from the second reflective mirror 46 is applied to the dichroic mirror 51.

When the third-wavelength laser light is applied from the second reflective mirror 46 to the back face 51b of the dichroic mirror 51, most the third-wavelength laser light is reflected on the back face 51b of the dichroic mirror 51 and travels toward the beam expander lenses 53 and 54. Part of the third-wavelength laser light however passes from the back face 51b of the dichroic mirror 51 through the interior 51n of the dichroic mirror 51 to emerge from the front face 51a of the dichroic mirror 51, applied to the FMD 59.

The dichroic mirror 51 is configured to reflect most of the third-wavelength laser light with a wavelength of 770 to 830 nm and to allow part of the third-wavelength laser light with a wavelength of 770 to 830 nm to pass therethrough.

The third-wavelength laser light reflected at substantially right angles on the dichroic mirror 51 passes through the concave beam expander lens 53 and the convex beam expander lens 54 to reach the polarizing mirror 56.

The third-wavelength laser light is reflected at substantially right angles on the polarizing mirror 56 and passes through the liquid crystal correcting element 70 to traverse the wideband quarter-wave plate with aperture limit 74. When the third-wavelength laser light for CD with a wavelength of 770 to 830 nm traverses the wideband quarter-wave plate with aperture limit 74, the third-wavelength laser light undergoes a phase correction. When passing through the wideband quarter-wave plate with aperture limit 74, the third-wavelength laser light enters the OBL 79 with the third-wavelength laser light masked and is narrowed down by the OBL 79. As a result of this, the third-wavelength laser light is narrowed down by the OBL 79 in the same state as the case where it is narrowed down by an OBL (not shown) with a numerical aperture of 0.45. Although the actual numerical aperture of the OBL 79 is about 0.6, the third-wavelength laser light is converged on the optical disk for CD in the same state as the case where the OBL (not shown) with the numerical aperture of about 0.45 is used to narrow down the third-wavelength laser light since the third-wavelength laser light enters the OBL 79 with the third-wavelength laser light masked as long as the wideband quarter-wave plate with aperture limit 74 is disposed on the optical path. By virtue of the disposition of the wideband quarter-wave plate with aperture limit 74 on the optical path, the OBL 79 having the numerical aperture of about 0.6 can function as one having the numerical aperture of 0.37 to 0.95, substantially of 0.45 to 0.65. The numerical aperture of the first OBL 69 for Blu-ray Disc is about 0.85.

The third-wavelength laser light in the form of s-linearly polarized light transmitted through the wideband quarter-wave plate with aperture limit 74 turns to circularly polarized light. The third-wavelength laser light in the form of s-linearly polarized light turns to e.g., right-hand (clockwise) circularly polarized light through the wideband quarter-wave plate with aperture limit 74. The third-wavelength laser light changed into the right-hand circularly polarized light passes through the second OBL 79 to be applied to a signal portion (not shown) of a CD-standard optical disk (not shown). The third-wavelength laser light applied to and reflected on -the front face 56a of the polarizing mirror 56 traverses the liquid crystal correcting element 70 and passes through the wideband quarter-wave plate with aperture limit 74 to change into the right-hand circularly polarized light, which in turn is converged through the second OBL 79 onto the signal portion of the CD-standard optical disk. Following such an outward path, the third-wavelength laser light converges on the CD-standard optical disk.

Description will then be made of a return path of the third-wavelength laser light reflected from the CD-standard optical disk. When the third-wavelength laser light is reflected from the CD-standard optical disk, the third-wavelength laser light in the form of right-hand circularly polarized light turns to left-hand (counterclockwise) circularly polarized light. The third-wavelength laser light in the form of left-hand circularly polarized light traverses the second OBL 79 and passes through the wideband quarter-wave plate with aperture limit 74. When the third-wavelength laser light passes through the wideband quarter-wave plate with limit 74, the third-wavelength laser light in the form of left-hand circularly polarized light turns to p-linearly polarized light. The third-wavelength laser light in the form of p-linearly polarized light transmitted through the wideband quarter-wave plate with aperture limit 74 traverses the liquid crystal correcting element 70 and reflects at substantially right angles on the polarizing mirror 56 to pass through the convex beam expander lens 54 and the concave beam expander lens 53 reaching the dichroic mirror 51.

When the third-wavelength laser light is applied from the beam expander lenses 53 and 54 to the back face 51b of the dichroic mirror 51, most of the third-wavelength laser light is reflected toward the second reflective mirror 46. The third-wavelength laser light on the return path is reflected at substantially right angles on the dichroic mirror 51 to be applied to the second reflective mirror 46.

The third-wavelength laser light in the form of p-linearly polarized light on the return path reflected from the second reflective mirror 46 traverses the second CL 45 and travels substantially straight within the interior of the third PBS 33 to pass therethrough, after which it travels substantially straight within the interior of the second PBS 23 to pass therethrough reaching the second sensor lens 48 for DVD or for CD. The third-wavelength laser light on the return path passes through the second sensor lens 49 for DVD or for CD to be applied to the second PDIC for DVD or for CD.

The LDs 10, 20, and 30, the PDICs 19 and 49, the active wave plate 50, the FMD 59, the liquid crystal correcting element 70, etc., are conductively connected to a flexible board (not shown) such as a flexible printed circuit (not shown). The flexible printed circuit is abbreviated to "FPC". The FPC is configured such that a plurality of circuit conductors (not shown) are printed on an insulating sheet (not shown), e.g., such that metal foils (not shown) such as copper foils are juxtaposed on the insulating sheet, on top of which transparent or semitransparent protective layer (not shown) is disposed.

The OPU 1 is configured to include the above constituent elements. The above constituent elements are mounted on a housing (not shown). Although the OPU 1 having the housing, etc., is provided with other constituent elements (not shown) than the shown elements, the other constituent elements are left out in FIG. 1 for convenience' sake.

As shown in FIG. 1, the OPU 1 is configured to at least include the first LD 10 capable of emitting laser light having the first wavelength, the second LD 20 capable of emitting laser light having the second wavelength different from the wavelength of the first-wavelength laser light emitted from the first LD 10, the polarizing mirror 56 that transmits or reflects the first-wavelength laser light emitted from the first LD 10 and that reflects the second-wavelength laser light emitted from the second LD 20, the first OBL 69 that converges the first-wavelength laser light on the first medium 100, and the second OBL 79 that converges the first-wavelength laser light or the second-wavelength laser light on the second medium 200.

By thus configuring the OPU 1, there can be provided the OPU 1 capable of supporting both the first medium and the second medium 200 even though the first medium 100 is different in the standard from the second medium 200. If the first medium 100 is a new standard, Blu-ray Disc-standard medium not serving the conventional standards but allowing high-density recording and if the second medium 200 is a DVD-standard medium serving the conventional standards, it has been difficult to develop a single OPU 1 capable of supporting both the first medium 100 and the second medium 200 that have quite different standards.

To deal with this, an optical disk device (not shown) was also conceived for example that employs two different types of OPUs, a first OPU (not shown) supporting the first medium 100a and a second OPU (not shown) supporting the second medium 200. It was however feared due to the increase in the number of components that the optical disk device using a plurality of OPUs, the first OPU (not shown) supporting the first medium 100a and the second OPU (not shown) supporting the second medium 200 may be faced with increased dimensions resulting in increase of weight and raise in price. In contrast, a single OPU 1 becomes capable of supporting both the first medium 100 of Blu-ray Disc standard that is a new high-density recording standard and the second medium 200 serving the DVD standard that is a conventional standard quite different from the first medium 100 by configuring the single OPU 1 so as to at least include the first LD 10 capable of emitting laser light having the first wavelength, the second LD 20 capable of emitting laser light having the second wavelength different from the first-wavelength laser light emitted from the first LD 10, the polarizing mirror 56 that transmits or reflects the first-wavelength laser light emitted from the first LD 10 and that reflects the second-wavelength laser light emitted from the second LD 20, the first OBL 69 that converges the first-wavelength laser light on the first medium 100, and the second OBL 79 that converges the first-wavelength laser light or the second-wavelength laser light on the second medium 200. Thus, the OPU 1 supporting the media 100, 200, etc., of different standards can be provided to assembly companies or users of the OPU 1.

The OPU 1 is configured to include the liquid crystal element 50, so-called active wave plate 50 capable of freely polarizing the first-wavelength laser light.

By disposing the active wave plate 50 on the optical path of the OPU 1, the first-wavelength laser light can securely be directed toward the first OBL 69 or the second OBL 79. The active wave plate 50 is used to change the state of polarization of the first-wavelength laser light so that the first-wavelength laser light can pass through or reflect from the polarizing mirror 56. This allows the first-wavelength laser light to securely be directed toward the first OBL 69 or the second OBL 79. When the first-wavelength laser light from the active wave plate 50 traveling through the polarizing mirror 56 is p-linearly polarized light, the first-wavelength laser light in the form of p-linearly polarized light traverses the polarizing mirror 56 to reach the first OBL 69.

This allows the first-wavelength laser light in the form of p-linearly polarized light to pass through the polarizing mirror 56 to securely reach the first OBL 69. Since the first-wavelength laser light traveling via the polarizing mirror 56 is determined to be p-linearly polarized light, the state of polarization of the first-wavelength laser light can be made clear. The polarizing mirror 56 is formed to transmit the first-wavelength laser light in the form of p-linearly polarized light. Hence, the first-wavelength laser light in the form of p-linearly polarized light is securely transmitted through the polarizing mirror 56 to securely reach the first OBL 69.

When the first-wavelength laser light from the active wave plate 50 traveling through the polarizing mirror 56 is s-linearly polarized light, the first-wavelength laser light in the form of s-linearly polarized light is reflected on the polarizing mirror 56 to reach the second OBL 79.

This allows the first-wavelength laser light in the form of s-linearly polarized light to reflect from the polarizing mirror 56 to securely reach the second OBL 79. Since the first-wavelength laser light traveling via the polarizing mirror 56 is determined to be s-linearly polarized light, the state of polarization of the first-wavelength laser light can be made clear. The polarizing mirror 56 is formed to reflect the first-wavelength laser light in the form of s-linearly polarized light. Hence, the first-wavelength laser light in the form of s-linearly polarized light is securely reflected on the polarizing mirror 56 to securely reach the second OBL 79.

The OPU 1 is configured to include the third LD 30 capable of emitting laser light having the third wavelength different from the wavelength of the first-wavelength laser light and from the wavelength of the second-wavelength laser light.

This enables the OPU 1 to be adapted for the third-wavelength laser light and to support the third medium of CD standard. Thus, the multiple-media enabled OPU 1 can be provided to e.g., assembly companies or users of the OPU 1.

The third-wavelength laser light for CD is reflected from the polarizing mirror 56 and converges through the second OBL 79 on the third medium (not shown).

This enables the OPU 1 to support the CD-type third medium adapted for the third-wavelength laser light. This OPU 1 becomes able to support the Blu-ray Disc-standard first medium adapted for the first-wavelength laser light, the DVD-standard second medium 200 adapted for the second-wavelength laser light, and the CD-standard third medium adapted for the third-wavelength laser light. Accordingly, the assembly companies or users of the OPU 1 for example can be supplied with the OPU 1 capable of supporting various media of different standards such as Blu-ray standard, DVD standard, and CD standard.

Another optical pickup unit of FIG. 2 will be described hereinbelow.

Figure 2:
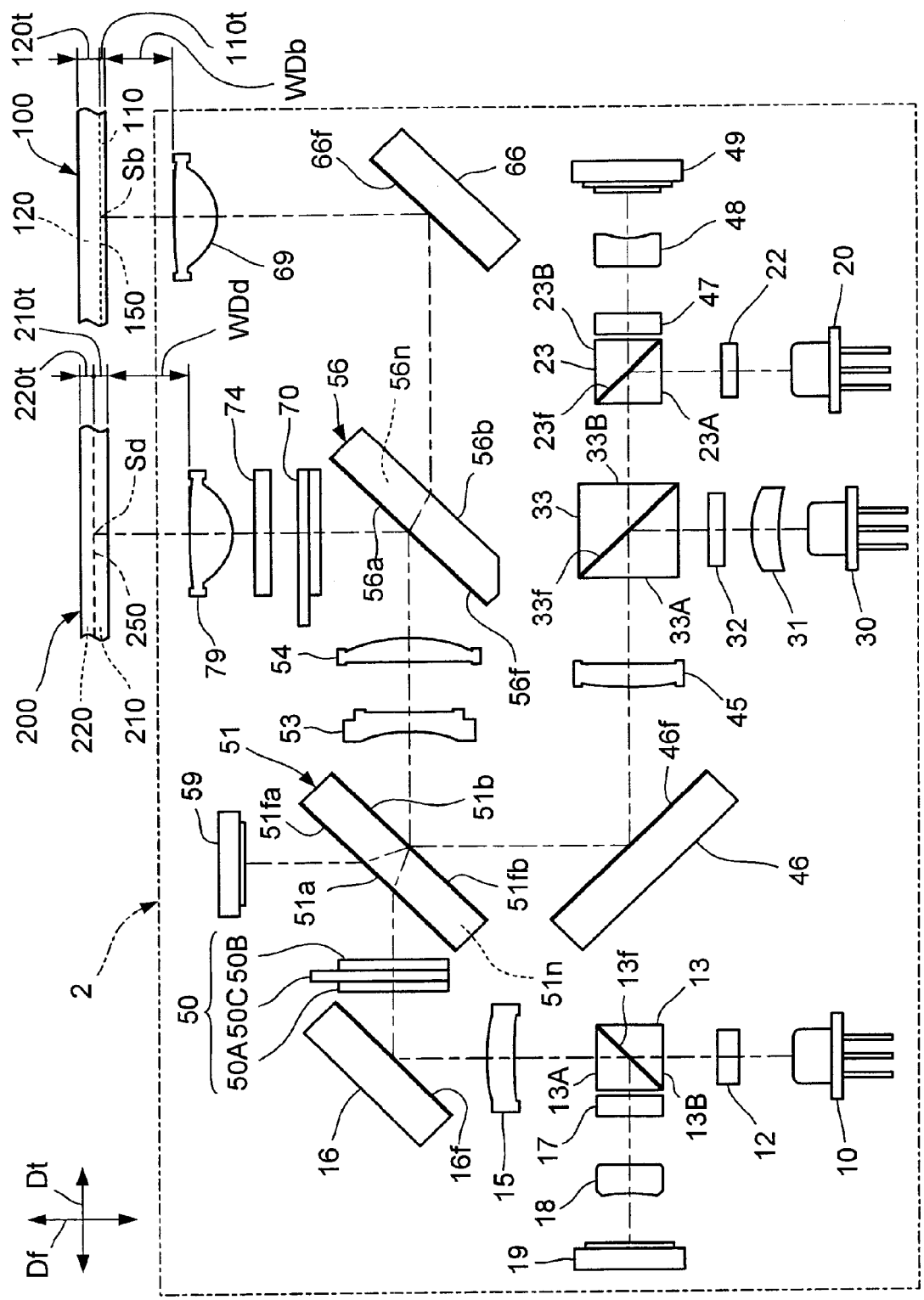
FIG. 2 is a schematic view of a second embodiment of the optical pickup unit according to the present invention.

FIG. 2 is a schematic view of a second embodiment of the optical pickup unit according to the present invention.

The OPU generally designated at 2 employs a focusing detection method of converging spots Sb and Sd, which focusing detection method is based on a knife-edge method. The knife-edge method in this specification refers to a method of detecting errors of the converging spots Sb and Sd using e.g., DOEs 17 and 47 having knife edge and diffraction grating functions. The OPU 2 is an OPU having an optical system based on the knife-edge method. The OPU 2 employs a tracking detection method of the converging spots Sb and Sd, which tracking detection method is based on a differential push-pull method or on the phase difference method similar to the OPU 1 (FIG. 1) of the first embodiment.

As shown in FIG. 2, the first return-path DOE 17 for "Blu-ray Disc" or for "HD DVD" is disposed between the first PBS 13 and the first sensor lens 18. The first return-path DOE 17 is a DOE having a knife edge formed by a multi-split hologram element such as a four-split hologram element. This OPU 2 is configured to include the first return-path DOE 17 having the knife edge formed by the four-split hologram element.

The OPU 1 of the first embodiment shown in FIG. 1 is different in the above portions from the OPU 2 of the second embodiment shown in FIG. 2. However, the first-embodiment OPU 1 (FIG. 1) and the second-embodiment OPU 2 (FIG. 2) are the same in the other portions. In the OPU 2 of the second embodiment shown in FIG. 2, the same or identical reference numerals are imparted to the same elements as in the OPU 1 of the first embodiment shown in FIG. 1, which will not again be described in detail.

Description will first be made of an optical path of the first-wavelength laser light from the first LD 10 (FIG. 2) passing through the first CBL 69 to be applied to the "Blu-ray Disc" standard first medium 100 to be reflected therefrom reaching the first PDIC 19. Due to the same optical path descriptions as in the first embodiment, detailed descriptions will not again be given of the optical path of the first-wavelength laser light from the first LD 10 passing through the first OBL 69 to be applied to the "Blu-ray Disc" standard first medium 100 to be reflected therefrom returning to the first PBS 13 and of the optical path of the first-wavelength laser light reaching the FMD 59.

The first-wavelength s-laser light on the return path incident on the first PBS 13 through the first CL 15 is refracted at substantially right angles within the interior of the first PBS 13 to pass therethrough reaching the first return-path DOE 17 for "Blu-ray Disc" or for "HD DVD". The first-wavelength laser light on the return path transmitted through the first return-path DOE 17 passes through the first sensor lens 18 for "Blu-ray Disc" or for "HD DVD". The first-wavelength laser light on the return path transmitted through the first sensor lens 18 strikes on the first PDIC 19 for "Blu-ray Disc" or for "HD DVD".

Description will then be made of an optical path of the first-wavelength laser light from the first LD 10 passing through the second OBL 79 to be applied to the "HD DVD" standard second medium 200 to be reflected therefrom reaching the first PDIC 19. Due to the same optical path descriptions as in the first embodiment, detailed descriptions will not again be given of the optical path of the first-wavelength laser light from the first LD 10 passing through the second OBL 79 to be applied to the "Blu-ray Disc" standard second medium 200 to be reflected therefrom returning to the first PBS 13 and of the optical path of the first-wavelength laser light reaching the FMD 59.

The first-wavelength s-laser light on the return path incident on the first PBS 13 through the first CL 15 is refracted at substantially right angles within the interior of the first PBS 13 to pass therethrough reaching the first return-path DOE 17 for "Blu-ray Disc" or for "HD DVD". The first-wavelength laser light on the return path transmitted through the first return-path DOE 17 passes through the first sensor lens 18 for "Blu-ray Disc" or for "HD DVD" to strike on the first PDIC 19 for "Blu-ray Disc" or for "HD DVD".

Description will then be made of an optical path of the second-wavelength laser light from the second LD 20 passing through the second OBL 79 to be applied to the DVD-standard second medium 200 to be reflected therefrom reaching the second PDIC 49. Due to the same optical path descriptions as in the first embodiment, detailed descriptions will not again be given of the optical path of the second-wavelength laser light from the second LD 20 passing through the second OBL 79 to be applied to the DVD-standard second medium 200 to be reflected therefrom returning to the second PBS 23 and of the optical path of the second-wavelength laser light reaching the FMD 59.

After having traversed the second CL 45 and passed substantially straight through the interior of the third PBS 33 to reach the second PBS 23, the second-wavelength laser light in the form of p-linearly polarized light on the return path further passes substantially straight through the interior of the second PBS 23 to reach the second return-path DOE 47 for DVD or for CD. The second-wavelength laser light on the return path transmitted through the second return-path DOE 47 passes through the second sensor lens 48 for DVD or for CD to be applied to the second PDIC 49 for DVD or for CD.

Description will then be made of an optical path of the third-wavelength laser light from the third LD 30 passing through the second OBL 79 to be applied to a CD-standard third medium (not shown) to be reflected therefrom reaching the second PDIC 49. Due to the same optical path descriptions as in the first embodiment, detailed descriptions will not again be given of the optical path of the third-wavelength laser light from the third LD 30 passing through the second OBL 79 to be applied to a CD-standard third medium (not shown) to be reflected therefrom returning to the second PBS 23 and of the optical path of the third-wavelength laser light reaching the FMD 59.

After having traversed the second CL 45 and passed substantially straight through the interior of the third PBS 33 to reach the second PBS 23, the third-wavelength laser light in the form of p-linearly polarized light on the return path further passes substantially straight through the interior of the second PBS 23 to reach the second return-path DOE 47 for DVD or for CD. The third-wavelength laser light on the return path transmitted through the second return-path DOE 47 passes through the second sensor lens 48 for DVD or for CD to be applied to the second PDIC 49 for DVD or for CD.

A further optical pickup unit of FIG. 3 will be described hereinbelow.

Figure 3:
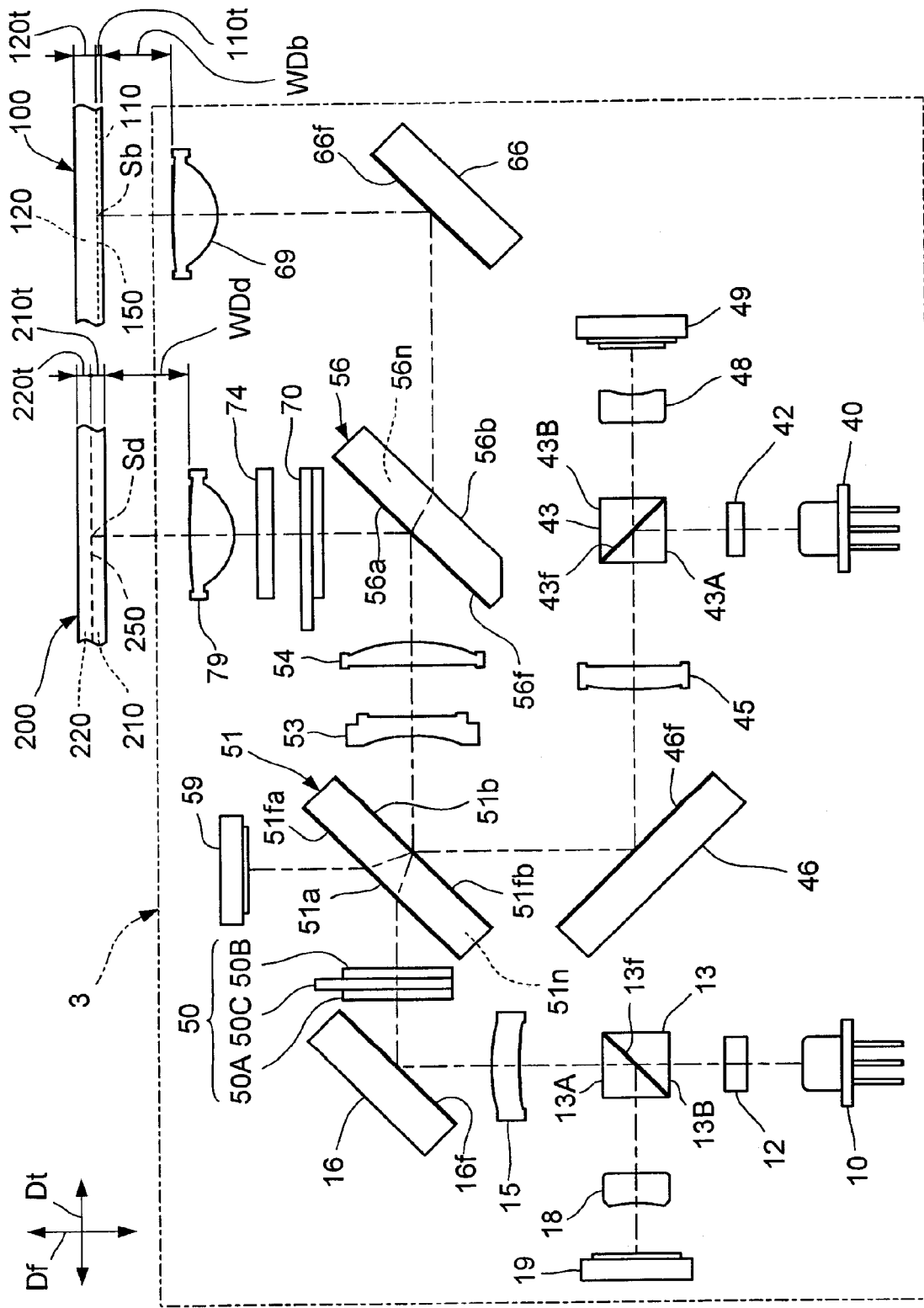
FIG. 3 is a schematic view of a third embodiment of the optical pickup unit according to the present invention.

FIG. 3 is a schematic view of a third embodiment of the optical pickup unit according to the present invention.

The OPU generally designated at 3 employs a focusing detection method of the converging spots Sb and Sd, which focusing detection method is based on the differential astigmatism method, similar to the OPU 1 (FIG. 1) of the first embodiment. The OPU 3 (FIG. 3) is an OPU having an optical system based on the differential astigmatism method. The OPU 3 also employs a tracking detection method of the converging spots Sb and Sd (FIG. 3), which tracking detection method is based on the differential push-pull method the phase difference method, similar to the OPU 1 (FIG. 1) of the first embodiment.

In lieu of the second LD 20 and the third LD 30 shown in FIG. 1, the OPU 3 is provided with another LD 40 (FIG. 3) formed by putting the second LD 20 and the third LD 30 together. The another LD 40 is capable of emitting laser light for DVD having a wavelength of about 630 to 685 nm and laser light for CD having a wavelength of about 770 to 830 nm. The another LD 40 is a dual-wavelength LD 40 capable of emitting laser light for DVD having a reference wavelength of about 635 or about 650 nm and laser light for CD having a reference wavelength of about 780 nm. The OPU 3 of FIG. 3 uses the another LD 40 as the second LD 40 for convenience' sake.

The divergent lens 31 of FIG. 1 is excluded from the OPU 3 of FIG. 3.

In place of the second outward-path DOE 22 and the third outward-path DOE 32 shown in FIG. 1, the OPU 3 is provided with another outward-path DOE 42 (FIG. 3) formed by putting the second outward-path DOE 22 and the third outward-path DOE 32 together. The another DOE 42 is adaptable to laser light for DVD having a wavelength of about 630 to 685 nm and laser light for CD having a wavelength of about 770 to 830 nm. The OPU 3 of FIG. 3 uses the another outward-path DOE 42 as the second outward-path DOE 42 for convenience' sake. This DOE 42 is configured as a special DOE.

In place of the second PBS 23 and the third PBS 33 shown in FIG. 1, the OPU 3 is provided with another PBS 43 (FIG. 3) formed by putting the second PBS 23 and the third PBS 33 together. The another PBS 43 is adaptable to laser light for DVD having a wavelength of about 630 to 685 nm and laser light for CD having a wavelength of about 770 to 830 nm. The OPU 3 of FIG. 3 uses the another PBS 43 as the second PBS 43 for convenience' sake.

The OPU 1 of the first embodiment shown in FIG. 1 is different in the above portions from the OPU 3 of the third embodiment shown in FIG. 3. However, the first-embodiment OPU 1 (FIG. 1) and the third-embodiment OPU 3 (FIG. 3) are the same in the other portions. In the OPU 3 of the third embodiment shown in FIG. 3, the same or identical reference numerals are imparted to the same elements as in the OPU 1 of the first embodiment shown in FIG. 1, which will not again be described in detail.

Due to the same optical path descriptions as in the first embodiment, detailed descriptions will not again be given of the optical path of the first-wavelength laser light from the first LD 10 (FIG. 3) passing through the first OBL 69 to be applied to the "Blu-ray Disc" standard first medium 100 to be reflected therefrom reaching the first PDIC 19 and of the optical path of the first-wavelength laser light reaching the FMD 59.

Due to the same optical path descriptions as in the first embodiment, detailed descriptions will not again be given of the optical path of the first-wavelength laser light from the first LD 10 passing through the second OBL 79 to be applied to the "HD DVD" standard second medium 200 to be reflected therefrom reaching the first PDIC 19 and of the optical path of the first-wavelength laser light reaching the FMD 59. Description will be made of an optical path of the second-wavelength laser light from the second LD 40 passing through the second OBL 79 to be applied to the DVD-standard second medium 200 to be reflected therefrom reaching the second PDIC 49.

Current is supplied from the LDD to the second light-emitting element 40 so that the second light-emitting element 40 emits laser light of the second wavelength. Describing in detail, current flows from the LDD to the light-emitting element 40 for CD and DVD to allow the light-emitting element 40 for CD and DVD to issue laser light having a wavelength adapted to the DVD-type disks. The second light-emitting element 40 sends out red laser light having a wavelength of about 630 to 685 nm with its reference wavelength of about 635 nm or about 650 nm.

By the action of red laser light with a wavelength of 630 to 685 nm emitted from the second LD 40 as a result of current supplied from the LDD to the second LD 40, information is recorded on the DVD-standard optical disk 200 or information recorded on the DVD-standard optical disk 200 is reproduced.

The second-wavelength laser light issued from the second LD 40 passes through the second outward-path DOE 42. At that time, the second-wavelength laser light turns to s-linearly polarized light. The second-wavelength laser light in the form of s-linearly polarized light transmitted through the second outward-path DOE 42 is incident on the second PBS 43. The second PBS 43 is configured to reflect s-waves at substantially right angles within the interior of the PBS 43 and to allow p-waves to pass substantially straight therethrough.

The second PBS 43 is configured to include a first generally triangular prism-shaped member 43A and a second generally triangular prism-shaped member 43B meshing with the first member 43A. The first generally triangular prism-shaped member 43A is meshed with the second generally triangular prism-shaped member 43B to make up the second PBS 43 of a generally cubic shape. A special film 43*f* is disposed between the first member 43A and the second member 43B that make up the second PBS 13 in cooperation. The dichro-film 43*f* is formed within the interior of the second PBS 43. The dichro-film 43*f* within the second PBS 43 serves to allow second-wavelength s-laser light or third-wavelength s-laser light to reflect at substantially right angles and to allow second-wavelength p-laser light or third-wavelength p-laser light to travel substantially straight and pass therethrough. The second PBS 43 is configured to reflect second-wavelength s-laser light or third-wavelength s-laser light at substantially right angles within the interior of the PBS 43 and to allow second-wavelength p-laser light or third-wavelength p-laser light to travel substantially straight and pass therethrough.

This allows the second-wavelength s-laser light or the third-wavelength s-laser light incident on the second PBS 43 to reflect at substantially right angles within the interior of the second PBS 43 and pass through the interior of the second PBS 43 to leave the second PBS 43. On the other hand, the second-wavelength p-laser light or third-wavelength p-laser light incident on the second PBS 43 passes substantially straight through the interior of the second PBS 43 to leave the second PBS 43. The PBS 43 having the dichro-film 43f therewithin can be e.g., a dichroic prism manufactured by TAMRON Inc. After having passed through the second outward-path DOE 42, the second-wavelength laser light in the form of s-linearly polarized light or the third-wavelength laser light in the form of s-linearly polarized light is refracted at substantially right angles within the interior of the second PBS 43 for DVD and CD to pass therethrough.

The dichro-film 43f is formed on a desired surface by using e.g., vacuum deposition, sputtering, etc. The dichro-film is formed as a thin layer containing at least one or more substances selected from a group consisting of $SiO_2$, $ZnO_2$, $TiO_2$ and $Ti_2O_5$.

The second-wavelength laser light refracted at substantially right angles within the second PBS 43 and transmitted therethrough passes through the second CL 45 for DVD or for CD to be applied to the second reflective mirror 46 for reflecting the second-wavelength light or the third-wavelength light.

Due to the same optical path descriptions as in the first embodiment, detailed descriptions will not again be given of the optical path along which the second-wavelength laser light transmitted through the second CL 45 for DVD or for CD to be applied to the second reflective mirror 46 for reflecting the second-wavelength light or the third-wavelength light passes through the second OBL 79 to be applied to and reflect from the DVD-standard second medium 200 reaching the second PDIC 49 or of the optical path of the second-wavelength laser light reaching the FMD 59.

Description will then be made of an optical path of the third-wavelength laser light from the second LD 40 passing through the second OBL 79 to be applied to a CD-standard third medium (not shown) to be reflected therefrom reaching the second PDIC 49.

Current is supplied from the LDD to the second light-emitting element 40 so that the second light-emitting element 40 emits laser light of the third wavelength. Describing in detail, current flows from the LDD to the light-emitting element 40 for CD and DVD to allow the light-emitting element 40 for CD and DVD to issue laser light having a wavelength adapted to the CD-type disks. The second light-emitting element 40 sends out e.g., laser light having a wavelength of about 770 to 830 nm with its reference wavelength of about 780 nm.

By the action of laser light with a wavelength of 770 to 830 nm emitted from the second LD 40 as a result of current supplied from the LDD to the second LD 40, information is recorded on the CD-standard optical disk or information recorded on the CD-standard optical disk is reproduced.

The third-wavelength laser light issued from the second LD 40 passes through the second outward-path DOE 42. At that time, the third-wavelength laser light turns to s-linearly polarized light. The third-wavelength laser light in the form of s-linearly polarized light transmitted through the second outward-path DOE 42 is incident on the second PBS 43. The third-wavelength laser light in the form of s-linearly polarized light transmitted through the second outward-path DOE 42 is refracted at substantially right angles within the interior of the second PBS 43 for DVD or for CD to pass therethrough.

The third-wavelength laser light refracted at substantially right angles within the second PBS 43 to pass therethrough traverses the second CL 45 for DVD or for CD to strike on the second reflective mirror 46 for reflecting the second-wavelength light or the third-wavelength light.

Due to the same optical path descriptions as in the first embodiment, detailed descriptions will not again be given of the optical path along which the third-wavelength laser light transmitted through the second CL 45 for DVD or for CD to be applied to the second reflective mirror 46 for reflecting the second-wavelength light or the third-wavelength light passes through the second OBL 79 to be applied to and reflect from the CD-standard third medium reaching the second PDIC 49 or of the optical path of the third-wavelength laser light reaching the FMD 59.

The second LD 40 of the OPU 3 is a dual-wavelength LD 40 capable of emitting the second-wavelength laser light for DVD and the third-wavelength laser light for CD whose wavelength is different from that of the first-wavelength laser light for "Blu-ray Disc" or for "HD DVD" and from that of the second-wavelength laser light for DVD.

The second outward-path DOE 42 of the OPU 3 is a DOE adaptable to two different wavelengths, i.e., the wavelength of the second-wavelength laser light for DVD and the wavelength of the third-wavelength laser light for CD. The second outward-path PBS 43 of the OPU 3 is a PBS adaptable to two different wavelengths, i.e., the wavelength of the second-wavelength laser light for DVD and the wavelength of the third-wavelength laser light for CD.

Use of the dual-wavelength LD 40 makes it feasible to configure the OPU 3 capable of supporting multiple media and to reduce the number of components of the OPU 3. Since the second LD 40 is configured as the dual-wavelength LD 40 capable of emitting the second-wavelength laser light for DVD and the third-wavelength laser light for CD, the OPU 3 is able to support multiple media. Along with this, the LD capable of emitting the second-wavelength laser light for DVD and the LD capable of emitting the third-wavelength laser light for CD are integrated into a single LD 40, so that the OPU 3 can achieve reductions in the number of components, weight, and size, as well as a fall in the price.

By using the DOE 42 adaptable to two different wavelengths, i.e., the wavelength of the second-wavelength laser light for DVD and the wavelength of the third-wavelength laser light for CD, the OPU 3 can achieve reductions in the number of components, weight, and size, as well as a fall in the price. By using the PBS 43 adaptable to two different wavelengths, i.e., the wavelength of the second-wavelength laser light for DVD and the wavelength of the third-wavelength laser light for CD, the OPU 3 can achieve reductions in the number of components, weight, and size, as well as a fall in the price.

Accordingly, the assembly companies of the OPU 3 or users of the OPU 3 can be supplied with the OPU 3 capable of supporting multiple media such as Blu-ray Disc-type media, DVD-type media such as "HD DVD", and CD-type media and capable of achieving reductions in the number of components, weight, and size, as well as a fall in the price.

An optical pickup unit of FIG. 4 will be described hereinbelow.

Figure 4:
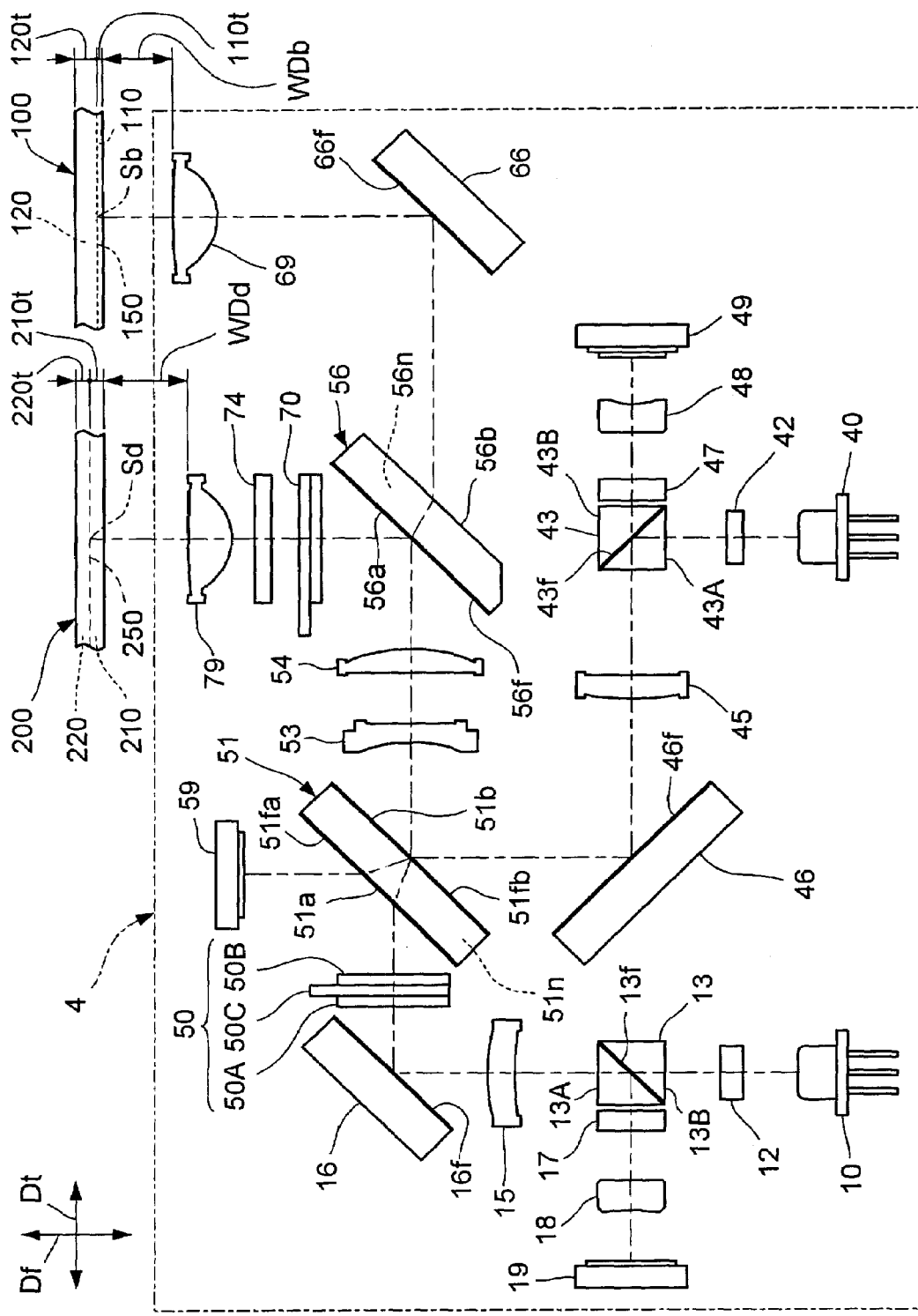
FIG. 4 is a schematic view of a fourth embodiment of the optical pickup unit according to the present invention.
Figure 5:
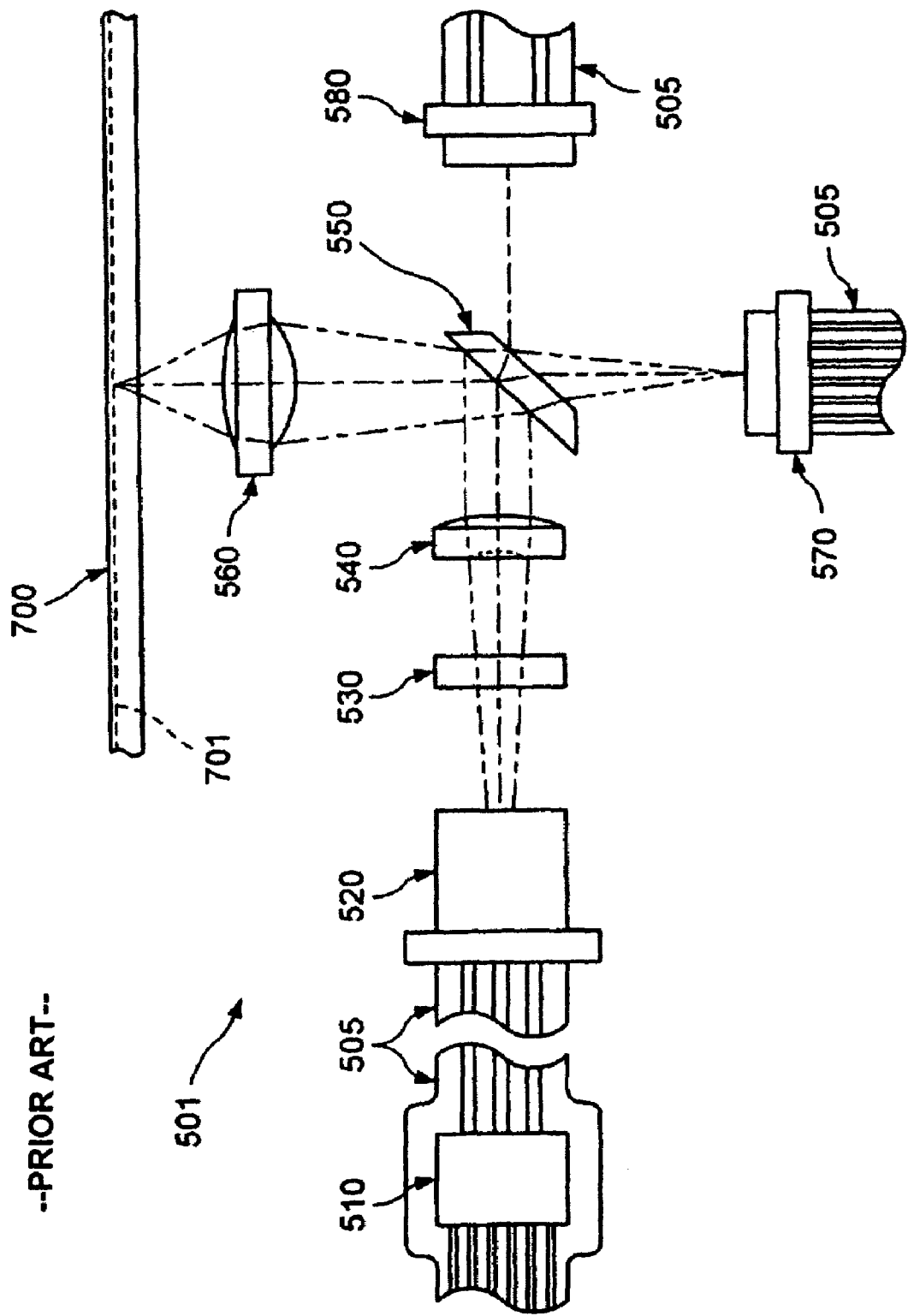
FIG. 5 is a schematic view of one form of a conventional optical pickup unit.

FIG. 4 is a schematic view of a fourth embodiment of the optical pickup unit according to the present invention.

The OPU generally designated at 4 employs a focusing detection method of converging spots Sb and Sd, which focusing detection method is based on the knife-edge method, similar to the OPU 2 (FIG. 2) of the second embodiment. The OPU 4 (FIG. 4) is an OPU having an optical system based on the knife-edge method. The OPU 4 employs a tracking detection method of the converging spots Sb and Sd, which tracking detection method is based on the differential push-pull method or on the phase difference method, similar to the OPU 1 (FIG. 1) of the first embodiment and to the OPU 3 (FIG. 3) of the third embodiment.

As shown in FIG. 4, the first return-path DOE 17 for "Blue-ray Disc" or for "HD DVD" is disposed between an optical path between the first PBS 13 and the first sensor lens 18. The OPU 4 is configured to include the first return-path DOE 17 having a knife edge formed by the four-split hologram element.

The second return-path DOE 47 for DVD or for CD is disposed on an optical path between the second PBS 43 and the second sensor lens 48. The OPU 4 is configured to include the second return-path DOE 47 having a knife edge formed by the four-split hologram element.

The OPU 3 of the third embodiment shown in FIG. 3 is different in the above portions from the OPU 4 of the fourth embodiment shown in FIG. 4. However, the third-embodiment OPU 3 (FIG. 3) and the fourth-embodiment OPU 4 (FIG. 4) are the same in the remaining portions. In the OPU 4 of the fourth embodiment shown in FIG. 4, the same or identical reference numerals are imparted to the same elements as in the OPU 1 of the first embodiment shown in FIG. 1 and as in the OPU 3 of the third embodiment shown in FIG. 3, which will not again be described in detail.

The divergent lens 31 of FIG. 1 is excluded from the OPU 4 of FIG. 4. The OPU 4 of FIG. 4 uses the another LD 40 as the second LD 40 for convenience' sake. The OPU 4 of FIG. 4 uses the another outward-path DOE 42 as the second outward-path DOE 42 for convenience' sake. The OPU 4 of FIG. 4 uses the another PBS 43 as the second PBS 43 for convenience' sake.

The second LD 40 of the OPU 4 (FIG. 4) is a dual-wavelength LD 40 capable of emitting the second-wavelength laser light for DVD and the third-wavelength laser light for CD whose wavelength is different from the wavelength of the first-wavelength laser light for "Blu-ray Disc" or for "HD DVD" and from the wavelength of the second-wavelength laser light for DVD.

The second outward-path DOE 42 of the OPU 4 is a DOE adaptable to two different wavelengths, i.e., the wavelength of the second-wavelength laser light for DVD and the wavelength of the third-wavelength laser light for CD. The second outward-path PBS 43 of the OPU 4 is a PBS adaptable to two different wavelengths, i.e., the wavelength of the second-wavelength laser light for DVD and the wavelength of the third-wavelength laser light for CD.

Description will first be made of an optical path of the first-wavelength laser light from the first LD 10 passing through the first OBL 69 to be applied to and reflect from the "Blu-ray Disc" standard first medium 100 reaching the first PDIC 19. Due to the same optical path descriptions as in the first embodiment, detailed descriptions will not again be given of the optical path of the first-wavelength laser light from the first LD 10 passing through the first OBL 69 to be applied to and reflect from the "Blu-ray Disc" standard first medium 100 returning to the first PBS 13 or of the optical path of the first-wavelength laser light reaching the FMD 59.

The first-wavelength s-laser light on the return path transmitted through the first CL 15 and incident on the first PBS 13 is refracted at substantially right angles within the interior of the first PBS 13 to pass therethrough reaching the first return-path DOE 17 for "Blu-ray Disc" or for "HD DVD". The first-wavelength laser light on the return path transmitted through the first return-path DOE 17 passes through the sensor lens 18 for "Blu-ray Disc" or for "HD DVD". The first-wavelength laser light on the return path transmitted through the first sensor lens 18 applied toes on the first PDIC 19 for "Blu-ray Disc" or for "HD DVD".

Description will then be made of an optical path of the first-wavelength laser light from the first LD 10 passing through the second OBL 79 to be applied to and reflected from the "HD DVD" standard second medium 200 reaching the first PDIC 19. Due to the same optical path descriptions as in the first embodiment, detailed descriptions will not again be given of the optical path of the first-wavelength laser light from the first LD 10 passing through the second OBL 79 to be applied to and reflect from the "HD DVD" standard second medium 200 returning to the first PBS 13 or of the optical path of the first-wavelength laser light reaching the FMD 59.

The first-wavelength s-laser light on the return path transmitted through the first CL 15 and incident on the PBS 13 is refracted at substantially right angles within the interior of the first PBS 13 to pass therethrough reaching the first return-path DOE 17 for "Blu-ray Disc" or for "HD DVD". The first-wavelength laser light on the return path transmitted through the first return-path DOE 17 passes through the first sensor lens 18 for "Blu-ray Disc" or for "HD DVD" to be applied to the first PDIC 19 for "Blu-ray Disc" or for "HD DVD".

Description will then be made of an optical path of the second-wavelength laser light from the second LD 40 passing through the second OBL 79 to be applied to and reflect from the DVD-standard second medium 200 reaching the second PDIC 49.

Current is supplied from the LDD to the second light-emitting element 40, with the result that the second light-emitting element 40 issues laser light of the second wavelength. More detailedly, when current flows from the LDD to the light-emitting element 40 for CD and DVD, the light-emitting element 40 for CD and DVD sends forth laser light having a wavelength adapted to the DVD-type disk. The second light-emitting element 40 emits e.g., red laser light having a wavelength of about 630 to 685 nm with its reference wavelength of about 635 nm or about 650 nm.

By the action of the red laser light with a wavelength of 630 to 685 nm emitted from the second LD 40 as a result of current supplied from the LDD to the second LD 40, information is recorded on the DVD-standard optical disk 200 or information recorded on the DVD-standard optical disk 200 is reproduced.

The second-wavelength laser light issued from the second LD 40 passes through the second outward-path DOE 42. At that time, the second-wavelength laser light turns to s-linearly polarized light. The second-wavelength laser light in the form of s-linearly polarized light transmitted through the second outward-path DOE 42 is incident on the second PBS 43. The second-wavelength laser light in the form of s-linearly polarized light is refracted at substantially right angles within the interior of the second PBS 43 for DVD and CD to pass therethrough.

The second-wavelength laser light refracted at substantially right angles within the second PBS 43 and transmitted therethrough passes through the second CL 45 for DVD or for CD to be applied to the second reflective mirror 46 for reflecting the second-wavelength light or the third-wavelength light.

Due to the same optical path descriptions as in the first embodiment, detailed descriptions will not again be given of the optical path along which the second-wavelength laser light transmitted through the CL 45 for DVD or for CD and incident on the second reflective mirror 46 for reflecting the second-wavelength light or the third-wavelength light passes through the second OBL 79 to be applied to and reflect from the DVD-standard second medium 200 returning to the second PBS 43 or of the optical path of the second-wavelength laser light reaching the FMD 59.

The second-wavelength laser light in the form of p-linearly polarized light on the return path transmitted through the second CL 45 and incident on the second PBS 43 passes substantially straight through the interior of the second PBS 43 reaching the second return-path DOE 47 for DVD or for CD. The second-wavelength laser light on the return path transmitted through the second return-path DOE 47 passes through the second sensor lens 48 for DVD or for CD to be applied to the second PDIC 49 for DVD or for CD.

Description will then be made of an optical path of the third-wavelength laser light from the second LD 40 passing through the second OBL 79 to be applied to and reflect from the CD-standard third medium reaching the PDIC 49.

Current is supplied from the LDD to the second light-emitting element 40 so that laser light of a third-wavelength is issued from the second light-emitting element 40. More detailedly, current flows from the LDD to the light-emitting element 40 for CD and DVD to allow the light-emitting element 40 for CD and DVD to output laser light with a wavelength adapted to the CD-type disks. The second light-emitting element 40 is capable of emitting laser light having a wavelength of about 770 to 830 nm with its reference wavelength of about 780 for example.

By the action of the laser light with a wavelength of 770 to 830 nm issued from the second LD 40 as a result of supplying current from the LDD to the second LD 40, information is recorded on the CD-standard optical disk or information recorded on the CD-standard optical disk is reproduced.

The third-wavelength laser light outputted from the second LD 40 passes through the second outward-path DOE 42. At that time, the third-wavelength laser light turns to s-linearly polarized light. The third-wavelength laser light in the form of s-linearly polarized light transmitted through the second outward-path DOE 42 is incident on the second PBS 43. The third-wavelength laser light in the form of s-linearly polarized light transmitted through the second outward-path DOE 42 is refracted at substantially right angles within the interior of the second PBS 43 for DVD or for CD to pass therethrough.

The third-wavelength laser light refracted at substantially right angles within the second PBS 43 and transmitted therethrough passes through the second CL 45 for DVD or for CD to be applied to the second reflective mirror 46 for reflecting the second-wavelength light or the third-wavelength light.

Due to the same optical path descriptions as in the first embodiment, detailed descriptions will not again be given of the optical path along which the third-wavelength laser light transmitted through the second CL 45 for DVD or for CD and incident on the second reflective mirror 46 for reflecting the second-wavelength light or the third-wavelength light passes through the second OBL 79 to be applied to and reflect from the CD-standard third medium returning to the second PBS 43 or of the optical path of the third-wavelength laser light reaching the FMD 59.

The third-wavelength laser light in the form of p-linearly polarized light on the return path transmitted through the second CL 45 and incident on the second PBS 43 passes substantially straight through the interior of the second PBS 43 reaching the second return-path DOE 47 for DVD or for CD. The third-wavelength laser light on the return path transmitted through the second return-path DOE 47 passes through the second sensor lens 48 for DVD or for CD to be applied to the second PDIC 49 for DVD or for CD.

The above OPUs 1, 2, 3, and 4 are able to support optical disks that include e.g., read-only optical disks such as "CD-ROM" and "DVD-ROM", recordable optical disks such as "CD-R", "DVD-R", and "DVD+R", and writable/erasable and rewritable optical disks such as "CD-RW", "DVD-RW", "DVD+RW", "DVD-RAM", "HD-DVD", and "Blu ray Disc".

The optical disk devices (not shown) equipped with the above OPUs 1, 2, 3, and 4 are able to be mounted on e.g., computers such as notebook personal computers (not shown), laptop personal computers (not shown), and desktop personal computers (not shown), audio equipment such as CD players, and audio/visual equipment (not shown) such as DVD players. The optical disk devices equipped with the above OPUs 1, 2, 3, and 4 are able to support a plurality of types of media that include CD-type optical disks and DVD-type optical disks.

The optical pickup units of the present invention are not intended to be limited to the ones shown in the drawings or to the ones described hereinabove.

For example, in lieu of the first OBL 69 for Blu-ray Disc shown in FIGS. 1 to 4, a pair of OBLs (not shown) may be disposed as the OBL for Blu-ray disk on the OPUs 1, 2, 3, and 4 such that the pair of OBLs are arranged in an overlapping manner along the direction of the optical axis of the first-wavelength laser light applied to the first medium 100. In other words, in place of the first OBL 69 for Blu-ray Disc shown in FIGS. 1 to 4, a pair of OBLs (not shown) arranged in series along the focusing direction for example may be disposed as the OBL for Blu-ray disk on the OPUs 1, 2, 3, and 4.

For example, in lieu of the single LDD, the OPUs 1, 2, 3, and 4 may be mounted with separate three LDDs (not shown), i.e., a first LDD (not shown) corresponding to the first LD 10, a second LDD (not shown) corresponding to the second LD 20, and a third LDD (not shown) corresponding to the third LD 30. The second LDD (not shown) corresponding to the second LD 20 and the third LDD (not shown) corresponding to the third LD 30 may be configured as a single LDD (not shown).

A liquid crystal correcting element (not shown) for Blu-ray Disc may be disposed on the optical path between the reflective mirror 66 for Blu-ray Disc and the first OBL 69 for "Blu-ray Disc.

The above descriptions are for the purpose of facilitating the understanding of the present invention and should not be construed as limiting the scope of the present invention. The optical pickup unit of the present invention can variously be altered or improved without departing from its spirit and encompasses the equivalents thereof.

What is claimed is:

1. An optical pickup unit comprising:
   a first light-emitting element configured to emit a first-wavelength light;
   a second light-emitting element configured to emit a second-wavelength light longer in wavelength than the first-wavelength light;
   a liquid crystal element configured to change a state of polarization of the first-wavelength light;
   a polarizing mirror configured to transmit or reflect the first-wavelength light based on the state of polarization of the first-wavelength light, and to reflect the second-wavelength light;
   a first objective lens configured to converge the first-wavelength light passing through the polarizing mirror on a first medium;
   a second objective lens configured to converge the first-wavelength light and the second-wavelength light both reflecting from the polarizing mirror on a second medium; and a quarter-wave plate with aperture limit through which the first-wavelength light and the second-wavelength light both reflecting from the polarizing mirror pass so as to reach the second objective lens, the quarter-wave plate with aperture limit being configured to pass the first-wavelength light reflecting from the polarizing mirror without change and configured to act on the second-wavelength light reflecting from the polarizing mirror.

2. The optical pickup unit of claim 1, wherein
when the first-wavelength light is polarized to be p-waves by the liquid crystal element, the first-wavelength light passes through the polarizing mirror to reach the first objective lens.

3. The optical pickup unit of claim 2, wherein
when the first-wavelength light is polarized to be s-waves by the liquid crystal element, the first-wavelength light reflects from the polarizing mirror to reach the second objective lens.

4. The optical pickup unit of claim 1, further comprising: a third light-emitting element configured to emit a third-wavelength light longer in wavelength than the second-wavelength light, wherein
the third-wavelength light is reflected from the polarizing mirror, and thereafter converged by the second objective lens on a third medium.

5. The optical pickup unit of claim 1, wherein the second light-emitting element is a dual-wavelength light-emitting element configured to emit the second-wavelength light and the third-wavelength light longer in wavelength than the second-wavelength light, and wherein
the third-wavelength light is reflected from the polarizing mirror, and thereafter converged by the second objective lens on a third medium.

6. The optical pickup unit of claim 4, wherein the third-wavelength light is converged in a masked state by the second objective lens on the third medium when passing through the quarter-wave plate with aperture limit.

7. The optical pickup unit of claim 1, wherein
the second objective lens functions as a lens having a numerical aperture within a range of 0.37 to 0.95.

8. The optical pickup unit of claim 1, further comprising:
a liquid crystal correcting element through which the first-wavelength light and the second-wavelength light both reflecting from the polarizing mirror pass so as to reach the second objective lens, the liquid crystal correcting element being configured to suppress an aberration of the first-wavelength light reflecting from the polarizing mirror.

9. The optical pickup unit of claim 1, wherein:
the polarizing mirror includes a polarizing film configured to transmit or reflect the first-wavelength light based on the state of polarization of the first-wavelength light, and
the polarizing film includes a layer containing at least one substance selected from the group consisting of $SiO_2$, $ZnO_2$, $TiO_2$, and $Ti_2O_5$.

* * * * *